(12) United States Patent
Murphey et al.

(10) Patent No.: US 12,168,529 B2
(45) Date of Patent: Dec. 17, 2024

(54) MORPHING SELF-STIFFENING ARRAY (MOSSA) AND HINGE

(71) Applicant: Opterus Research and Development, Inc., Fort Collins, CO (US)

(72) Inventors: Thomas W Murphey, Fort Collins, CO (US); Levi Nicholson, Wellington, CO (US)

(73) Assignee: Opterus Research and Development, Inc., Fort Collins, CO (US)

(*) Notice: Subject to any disclaimer, the term of this patent is extended or adjusted under 35 U.S.C. 154(b) by 49 days.

(21) Appl. No.: 18/068,716

(22) Filed: Dec. 20, 2022

(65) Prior Publication Data

US 2023/0211899 A1 Jul. 6, 2023

Related U.S. Application Data

(62) Division of application No. 17/701,277, filed on Mar. 22, 2022, now Pat. No. 12,024,317.

(Continued)

(51) Int. Cl.
*E05D 1/00* (2006.01)
*B64G 1/22* (2006.01)
(Continued)

(52) U.S. Cl.
CPC ............ *B64G 1/443* (2013.01); *B64G 1/2222* (2023.08); *F16C 11/12* (2013.01); *H02S 30/10* (2014.12);
(Continued)

(58) Field of Classification Search
CPC .. E05D 1/00; E05D 1/02; E05D 15/26; E05D 2005/145; B64G 1/222; B64G 1/2222;
(Continued)

(56) References Cited

U.S. PATENT DOCUMENTS 2,526,129 A * 10/1950 Groesbeck ................ E05D 1/02
16/225
3,386,128 A * 6/1968 Vyvyan ..................... E05D 1/00
16/225
(Continued)

FOREIGN PATENT DOCUMENTS

WO WO-2020232386 A1 11/2020

OTHER PUBLICATIONS

ISA/US International Search Report and Written Opinion for corresponding International Application No. PCT/US2022/021491, date of mailing Aug. 11, 2022 (17 pages).

*Primary Examiner* — Chuck Y Mah
(74) *Attorney, Agent, or Firm* — Harris Beach PLLC

(57) ABSTRACT

A self-deployable array of panels includes a plurality of panels, each panel having a first compressed panel thickness state and a second expanded panel thickness state, and including a spring bias element biased to the second expanded panel thickness state. A plurality of locking hinges hingedly couple each of the panels to an adjoining panel. Each locking hinge is biased to an open position. A release of stored potential energy of both of the spring bias element biased to the second expanded panel thickness state, and the locking hinges biased to the open position causes the self-deployable array of panels to self-deploy from a folded stowed state. A single part offset locking hinge is also described.

18 Claims, 44 Drawing Sheets

Related U.S. Application Data

(60) Provisional application No. 63/165,192, filed on Mar. 24, 2021.

(51) Int. Cl.
*B64G 1/44* (2006.01)
*F16C 11/12* (2006.01)
*H02S 30/10* (2014.01)
*H02S 30/20* (2014.01)

(52) U.S. Cl.
CPC ............ *H02S 30/20* (2014.12); *B64G 1/44* (2013.01); *Y10T 403/45* (2015.01)

(58) Field of Classification Search
CPC .... B64G 1/2229; B64G 1/2224; B64G 1/443; B64G 1/44; H02S 30/20; F16C 11/12; Y10T 403/45; H01Q 15/161
See application file for complete search history.

(56) References Cited

U.S. PATENT DOCUMENTS

| | | | |
|---|---|---|---|
| 3,592,354 A * | 7/1971 | Nielsen | E05D 1/02 16/225 |
| 3,615,035 A * | 10/1971 | Newton | E05D 1/02 16/225 |
| 4,232,724 A * | 11/1980 | Brown | E04B 2/7431 16/225 |
| 6,175,989 B1 * | 1/2001 | Carpenter | B64G 1/222 343/915 |
| 7,354,033 B1 | 4/2008 | Murphey et al. | |
| 8,434,196 B1 * | 5/2013 | Murphey | H01Q 15/161 16/225 |
| 9,718,639 B2 | 8/2017 | Baudasse et al. | |
| 10,411,363 B2 * | 9/2019 | Ceely | H01Q 1/288 |
| 11,060,318 B2 * | 7/2021 | Brensinger | A47B 13/003 |
| 2001/0037538 A1 * | 11/2001 | Duperray | B25J 17/0241 16/225 |
| 2002/0157326 A1 | 10/2002 | Zwanenburg | |
| 2002/0194702 A1 * | 12/2002 | Hinkley | E05D 1/02 16/260 |
| 2004/0078929 A1 * | 4/2004 | Schoemann | E05D 1/02 16/225 |
| 2005/0022465 A1 * | 2/2005 | Warren | B64G 1/222 52/653.2 |
| 2010/0163684 A1 * | 7/2010 | Dando | B64G 1/222 244/172.6 |
| 2010/0319270 A1 * | 12/2010 | Slade | B64G 1/222 52/71 |
| 2011/0097138 A1 * | 4/2011 | Eikelenboom | E06B 3/481 403/81 |
| 2012/0176736 A1 * | 7/2012 | Apgar | B32B 25/12 361/679.01 |
| 2013/0276266 A1 * | 10/2013 | Pendarvis | E05D 1/02 16/225 |
| 2017/0044808 A1 * | 2/2017 | Liao | E05D 1/02 |
| 2017/0047886 A1 | 2/2017 | Atwater et al. | |
| 2018/0142729 A1 * | 5/2018 | Lee | F16F 3/02 |
| 2019/0085552 A1 | 3/2019 | Merrifield | |
| 2020/0122864 A1 | 4/2020 | Murphey | |

* cited by examiner

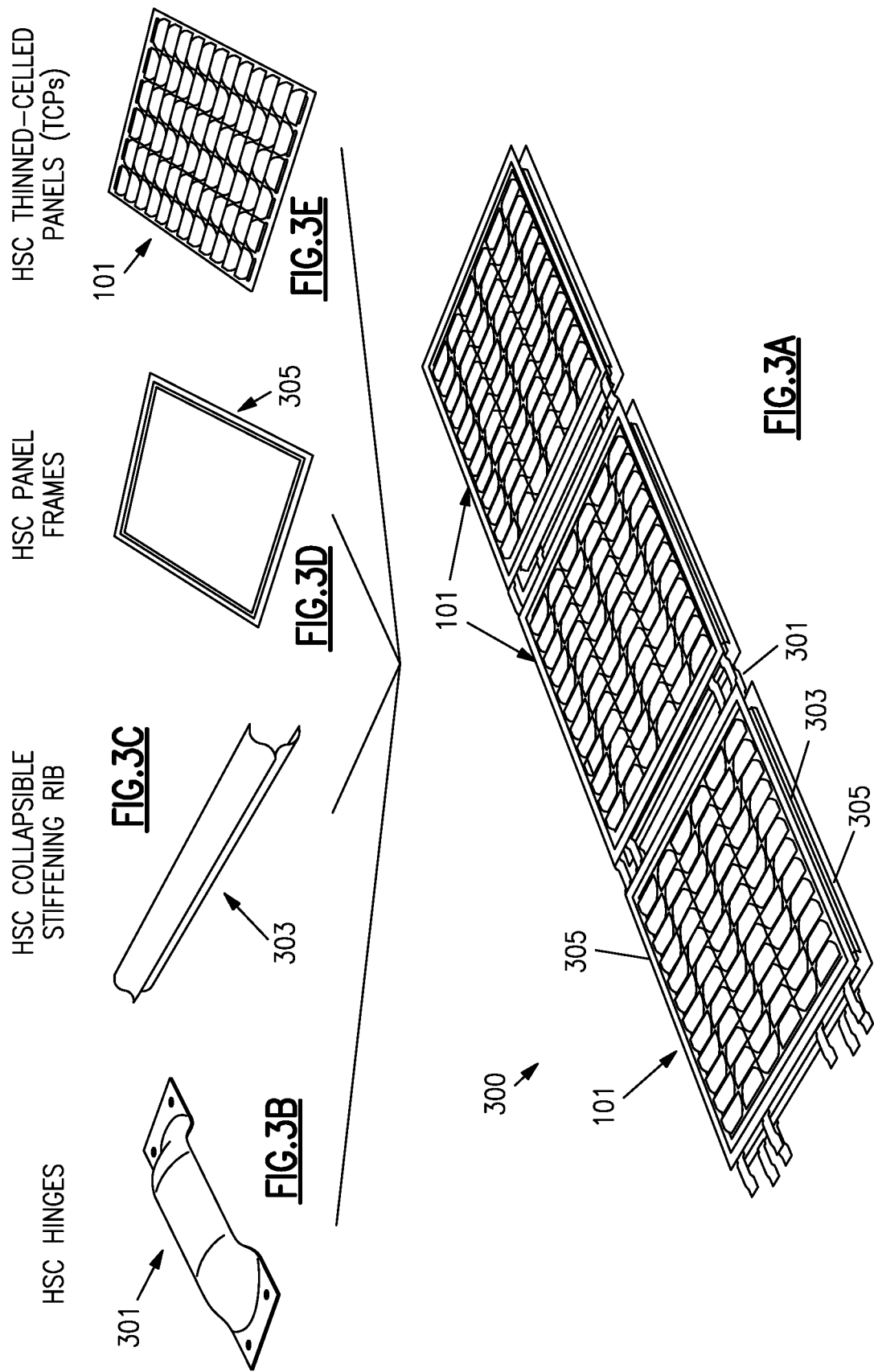

HSC HINGE

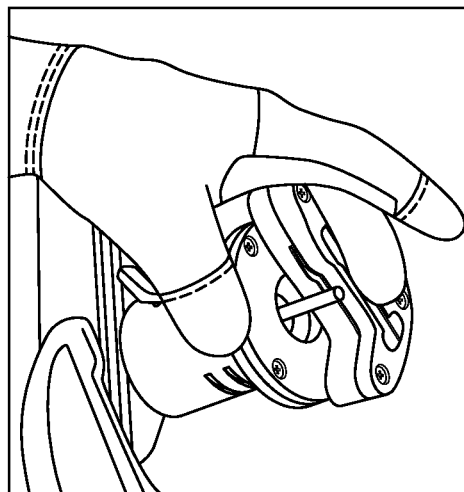
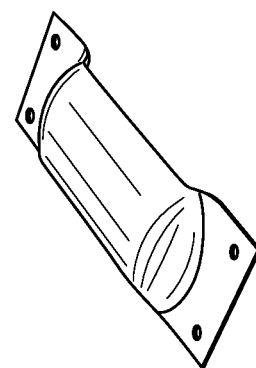
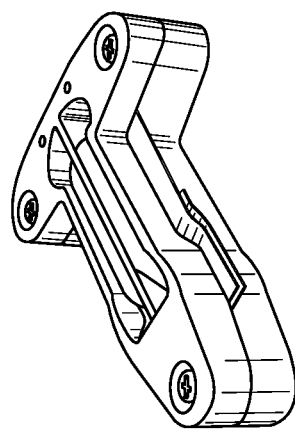
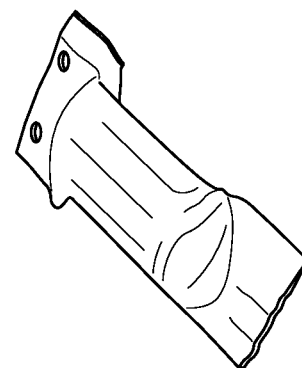
FIG.21
FIG.22

IMM-α Space Solar Cell
Highest Efficiency Space Solar Cell in Production

32.0%
Minimum Average Efficiency

Space Qualification & Characterization to the AIAA-S111-2014 standards in progress

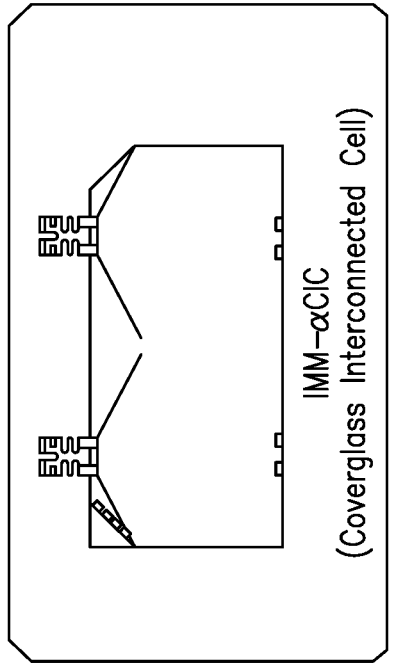

IMM-αCIC
(Coverglass Interconnected Cell)

FEATURES & CHARACTERISTICS

- Inverted metamorphic n-on-p solar cell
- 180 μm thickness on rigid carrier substrate
- Solar cell mass 4.9 mg/cm² which represents a 42% reduction as compared to the ZTJ solar cell
- Radiation hardened design @ 1-MeV, 1E15 e-/cm² fluence P/Po = 0.87 (ECSS post-radiation annealing)
- ~3% absolute remaining factor advantage versus ZTJ in charged proton environments with proton fluences equivalent to ~5e14 e-/cm² to 1e15 e-/cm², 1-MeV electrons
- Compatible with corner-mounted silicon bypass diode for individual cell reverse bias protection
- Exellent mechanical strength for reduced attrition during assembly and laydown
- Weldable or solderable contacts
- Custom sizes available

FIG.23

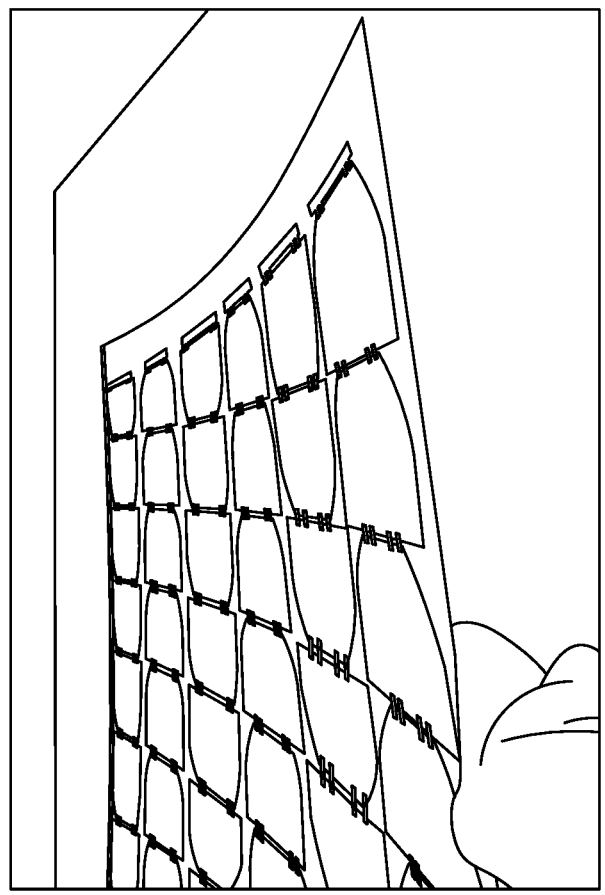
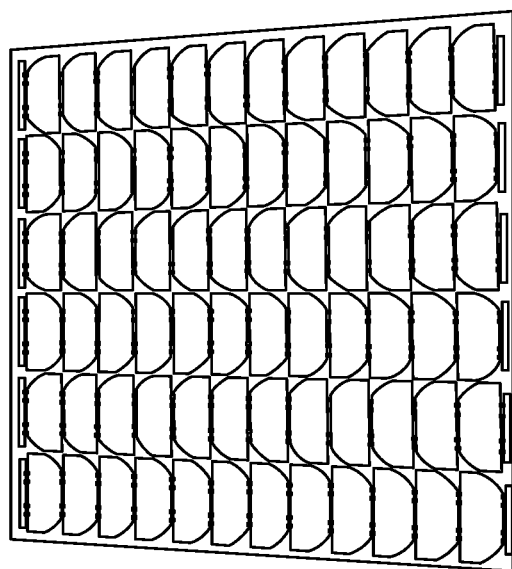
FIG.24

TABLE 1-TCP MASS BREAKDOWN

| | QTY OR VOLUME (cm³) | MASS EA. (g) OR DENSITY (g/cm³) | TOTAL(g) |
|---|---|---|---|
| MASS OF TCP PVA LAMINATE | | | |
| CICs | 72 | 2.8 | 202 |
| TERMINAL STRIPS | 12 | 0.1 | 1 |
| LAYDOWN ADHESIVE | 27.90 | 1.1 | 31 |
| DIODE BOARD (EST 1-3-DIODE BD) | 1 | 17.6 | 18 |
| WIRING EST@ 150g/m2 TYPICAL | 0.29 | 150.00 | 44 |
| LAMINATE-FIBERGLASS | 113.62 | 1.9 | 216 |
| TOTAL MASS (g) | | | 511 |

FIG.30

TABLE 2-ARRAY STRING PERFORMANCE METRICS

| STRING PERFORMANCE | | | | | | |
|---|---|---|---|---|---|---|
| STRING TYPE/CONDITION | TEMP (C) | STRING VOC (V) | STRING ISC (A) | STRING VMP (V) | STRING IMP (A) | STRING PMP (W) |
| IMM 12 CIC STRING @ 28°C | 28 | 56.98 | 0.331 | 50.7 | 0.311 | 15.76 |
| IMM 12 CIC STRING @ 50°C | 50 | 54.21 | 0.337 | 47.58 | 0.314 | 14.94 |
| IMM 12 CIC STRING @ 75°C | 75 | 51.07 | 0.335 | 44.51 | 0.315 | 14.01 |
| IMM 12 CIC STRING @ 100°C | 100 | 47.92 | 0.335 | 41.38 | 0.316 | 13.08 |

FIG.32

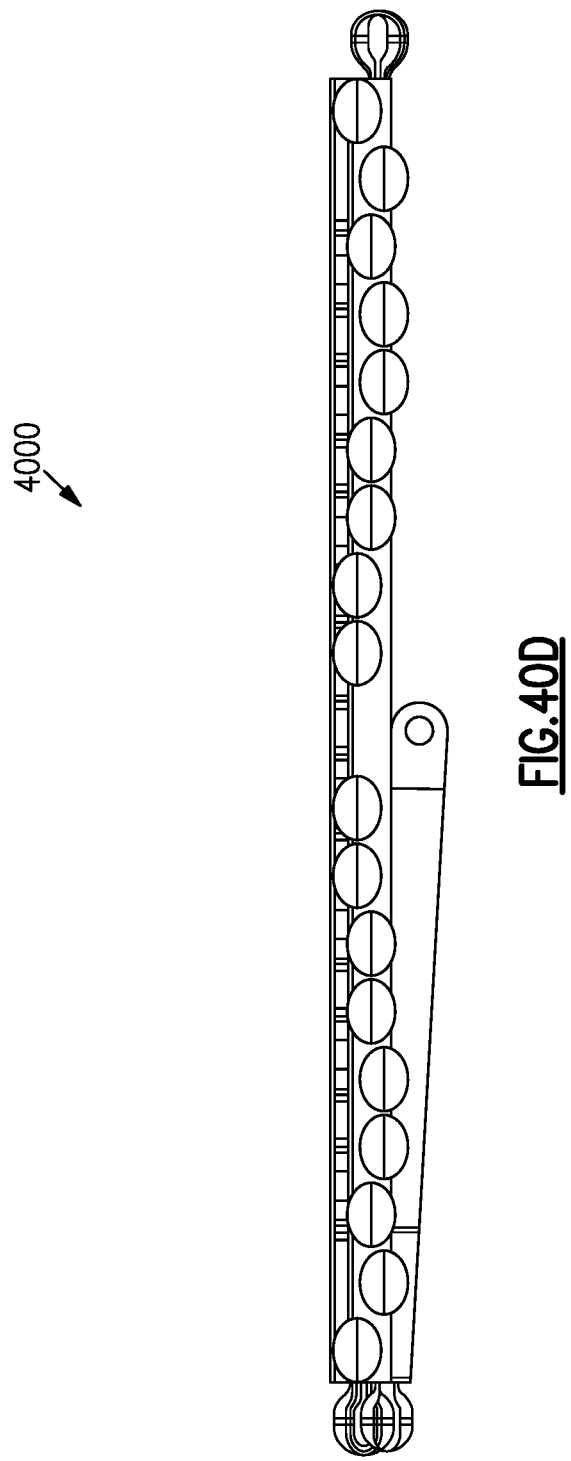

MORPHING SELF-STIFFENING ARRAY (MOSSA) AND HINGE

CROSS-REFERENCE TO RELATED APPLICATIONS

This application is a divisional application of U.S. patent application Ser. No. 17/701,277, filed Mar. 22, 2022, entitled MORPHING SELF-STIFFENING ARRAY (MOSSA) AND HINGE, which claims priority to and the benefit of U.S. provisional patent application Ser. No. 63/165,192, filed Mar. 24, 2021, which applications are each incorporated herein by reference in their respective entireties.

STATEMENT REGARDING FEDERALLY FUNDED RESEARCH OR DEVELOPMENT

This invention was made with Government support under contract FA9453-19-P-0674 awarded by the United States Air Force. The Government has certain rights in the invention.

FIELD OF THE APPLICATION

The application relates to an array of panels, particularly to a deployable array of panels for spaceflight and satellite applications.

BACKGROUND

Arrays of solar panels provide electrical power for many space flight and satellite applications. The arrays of panels are stowed for transport into space and then deployed once in outer space.

SUMMARY

A hinge apparatus for coupling at least two members comprises a hinge member defining a longitudinal axis, including a center segment, a transition segment extending from opposed ends of the center segment and a mounting flange segment extending from opposed ends of the transition segment, each mounting flange segment being offset with respect to the center segment.

In embodiments, the hinge member is configured to transition between a closed condition and an open condition. The center segment may be flexible to permit movement of the hinge member between the closed condition and the open condition. The hinge member may be biased toward the open condition. The center segment has a flexibility greater than a corresponding flexibility of each transition segment. The center segment may be configured to bend during movement of the hinge member between the closed condition and the open condition. The hinge member may be configured to lock upon transitioning to the open condition.

In embodiments, the center segment has a greater flexibility than a corresponding flexibility of each flange segment.

In certain embodiments, the center segment comprises one of a curved cross-section and a prismatic cross-section.

In other embodiments, each transition segment comprises a tangential spline shape. Each transition segment may include an outer surface defining multiple radii of curvature.

In embodiments, each transition segment is obliquely arranged with respect to the longitudinal axis.

In certain embodiments, the hinge member is a single monolithic unit.

In other embodiments, the hinge member comprises a composite material.

In other embodiments, each flange segment defines an opening to permit passage of a fastener.

In certain embodiments, wherein the hinge member is further configured to transition to a flat condition.

In another illustrative embodiment, a hinge apparatus for coupling at least two members comprises a hinge member defining a longitudinal axis, including a center segment, a transition segment extending from opposed ends of the center segment and a mounting flange segment extending from opposed ends of the transition segment. The center segment defines a flexibility greater than a corresponding flexibility of each transition segment. The center segment is configured to bend to permit transition of the hinge member between the closed condition and the open condition.

In embodiments, the center segment may be normally biased toward an orientation corresponding to the open condition of the hinge member.

In other embodiments, the hinge member is configured to lock upon transitioning to the open condition.

In certain embodiments, the hinge member is a single monolithic unit.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 3A is another drawing showing the MOSSA of FIG. 2;

FIG. 3B is a drawings showing a HSC hinge of the MOSSA of FIG. 2;

FIG. 3C is a drawings showing a HSC collapsible stiffening rib of the MOSSA of FIG. 2;

FIG. 3D is a drawings showing a HSC panel frame of the MOSSA of FIG. 2;

FIG. 3E is a drawings showing the HSC thinned-celled panels (TCPs) of the MOSSA of FIG. 2;

FIG. 21 is a drawing showing a hinge being trimmed and drilled with trim tool;

FIG. 22 is a drawing showing a partly (left) and fully trimmed and drilled hinge (right);

FIG. 23 is a drawing showing an exemplary IMM-α cell;

FIG. 24 is a drawing showing an exemplary TCP;

FIG. 30 is a table showing an exemplary TCP mass breakdown;

FIG. 32 is a table showing exemplary array string performance metrics;

FIG. 40D is a drawing showing a side view of the MOSSA of FIG. 40B.

DETAILED DESCRIPTION

As described hereinabove, arrays of solar panels provide electrical power for many space flight and satellite applications. The arrays of panels are stowed for transport into space and then deployed once in outer space.

DEFINITIONS, ABBREVIATIONS

Figure 1:
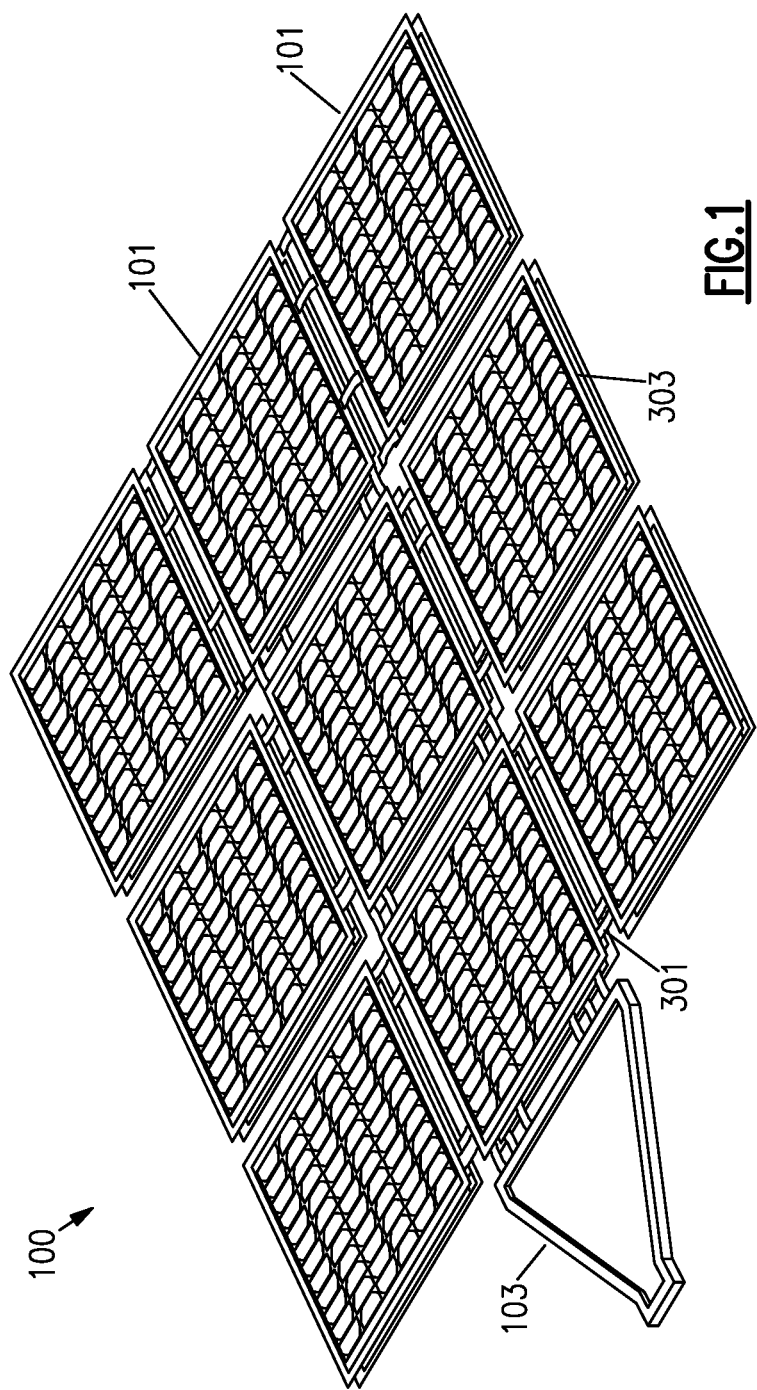
FIG. 1 is a drawing showing an exemplary 9 stiffened thin panel Morphing Self-Stiffening Array (MOSSA) having modules connected by hinges according to the Application.

CAD—Computer-Aided Design
CFH—Composite Flexure Hinge
CIC—Coverglass Interconnected Cell
DSS—Double Sigmoid Springs
gsm—grams per square meter
HSC—High Strain Composites
IMM—Inverted Metamorphic Multijunction NEA—
   Non-Explosive Actuator
MOSSA—Morphing Self-Stiffening Array
TCP—Thinned Celled Panel Morphing Self-Stiffening Array (MOSSA) panel—FIG. 1 is a drawing showing an exemplary 9 stiffened thin panel (MOSSA) array having modules connected by hinges according to the Application. The MOSSA is passively deployed using the stowed potential energy of folded hinges. An MOSSA of solar array modules can be used in a variety of spaceborne applications, such as, for example, to power a satellite. The modularity allows for multiple configurations. While the exemplary MOSSA of FIG. 1 has 9 modules, other exemplary modular configurations include, for example, 2, 3, 5, 7, and 9 modules. Typically, there is a line of symmetry and an MOSSA is symmetrical about the line of symmetry.

At least one panel at an end of a column of panels can be hingedly coupled to a base section of a spacecraft or satellite, such as, for example, by a yoke 103.

Figure 2:
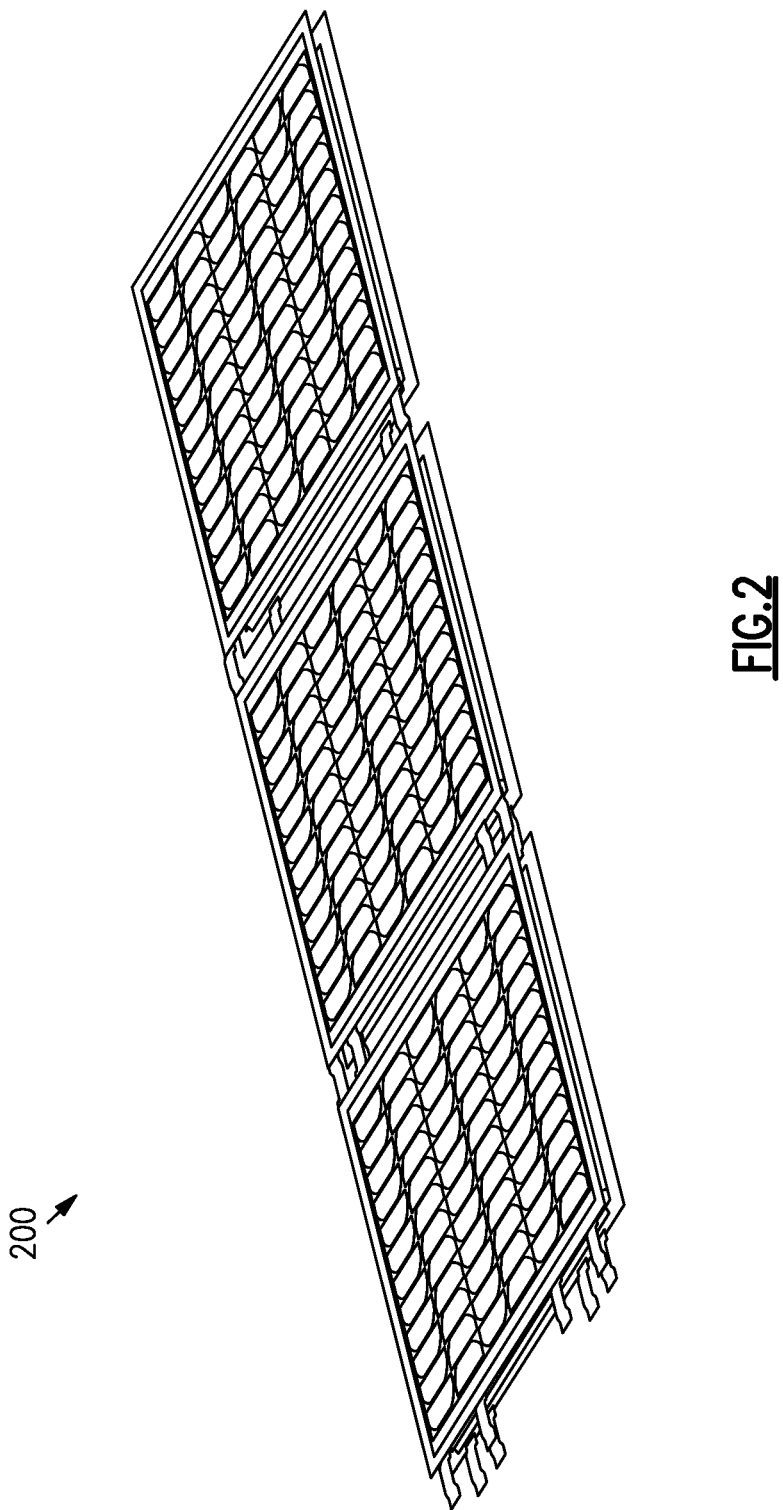
FIG. 2 is a drawing showing an exemplary 3 module MOSSA.

FIG. 2 is a drawing showing an exemplary 3 panel MOSSA. MOSSAs of this type can be made with 2, 3, 5, 7, 9, etc. modules. MOSSA can also be made of 1 and any whole number of modules. Arrays made from 1, 4, 6, 8, 10, etc. modules would deploy linearly. However, with too many modules the array could have undesirable deflection and be too plastic. For example, present MOSSA experimental implementations can deploy at least about four modules linearly without significant loss of stiffness.

FIG. 3A shows the MOSSA of FIG. 2. FIG. 3B to FIG. 3E highlight components of the MOSSA of FIG. 3A. FIG. 3B is a drawing showing an exemplary high strength composite (HSC) hinge. FIG. 3C is a drawing showing an exemplary HSC collapsible stiffening rib. An MOSSA can be made with any suitable type of hinge. The new HSC hinge as described in more detail hereinbelow is but one example of a hinge suitable for use with a MOSSA according to the Application. Each solar array module can have a solar array both sides, or could have a solar array on one side and a blank panel on the opposite side. In a stowed MOSSA folded and stowed state, each module is compressed together by deformable aspect of the HSC collapsible stiffening ribs, which ribs (e.g., FIG. 3C, 303) are collapsed in the stowed and folded state. On deployment, as the hinges (e.g., FIG. 3B, 301) open, and the modules unfurl into the MOSSA deployed state (FIG. 3A, 300), each module also opens to a thicker deployed module thickness state which is greater than the stowed model thickness where the HSC collapsible stiffening ribs are collapsed. Any suitable module thickening technique that increases in thickness on deployment can be used in place of the exemplary HSC collapsible stiffening ribs modules. Note that where hinges are present on both opposing panels, that when the panels move apart, the hinges on the opposing panels also move away from each other for increased stiffness of the deployed MOSSA. Use of the separated opposing hinges also provides for a higher first mode vibrational frequency.

Figure 4A:
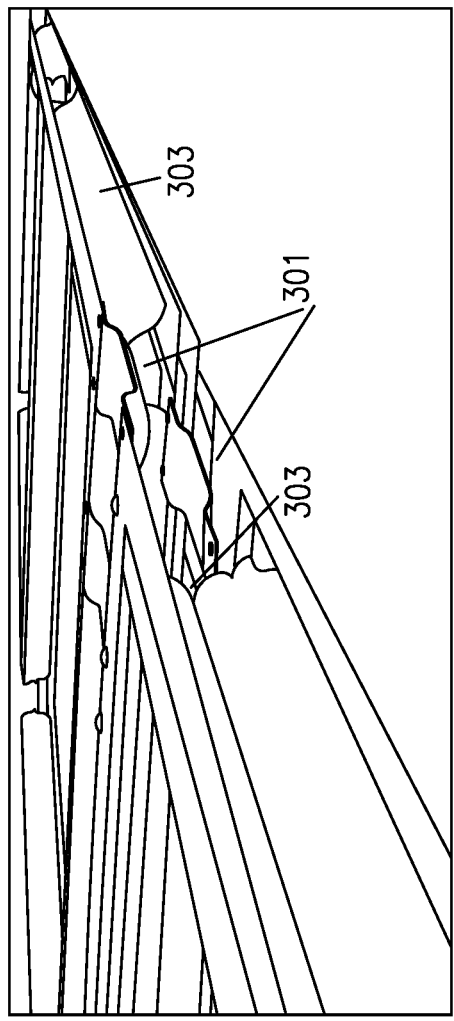
FIG. 4A is a drawing showing HSC hinges of a deployed experimentally implemented MOSSA.
Figure 4C:
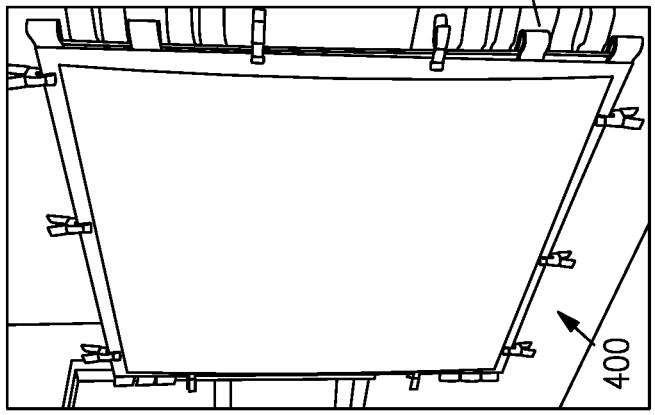
FIG. 4C is another drawing showing the stowed MOSSA of FIG. 4A held closed by a series of laboratory clips.
Figure 4B:
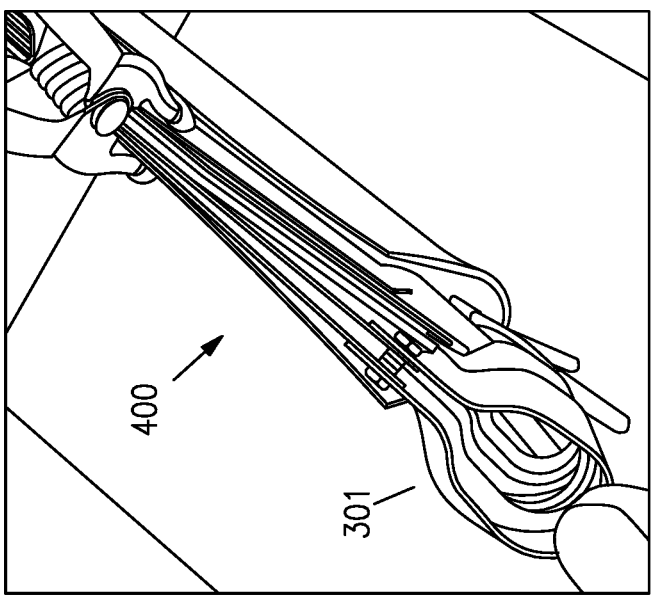
FIG. 4B is a drawing showing folded panels of the MOSSA of FIG. 4A held folded by laboratory clips.

FIG. 4A is a drawing showing HSC hinges of a deployed MOSSA. FIG. 4B is a drawing showing folded panels of an experimental implementation of a MOSSA held folded by laboratory clips. FIG. 4C is a drawing showing an experimental implementation of a stowed MOSSA held closed by a series of laboratory clips.

High Strength Composite (HSC) Hinges

Hinges of the prior art, such as those used in spaceflight and satellite construction have been made based on a prismatic cross section, typically a tape measure type structure, fixed or clamped at either end. A new type of hinge has been realized which incorporates end structures that transition from mounting flanges to the hinge cross section. The hinge cross section typically has a curved or prismatic cross section.

The advantage of the new high strength composite (HSC) hinge is that it is one single part, eliminating the previously required clamp hardware at both sides of the prior art multi-component hinges. Less parts leads to lower cost, and greater reliability. For example, instead of a transition from a rigid solid clamp to the foldable deformable hinge, there is now an integral transition section between a mountable flange surface and the folding hinge portion. The mountable face of the hinge is stiffer than the flexural region.

Figure 5B:
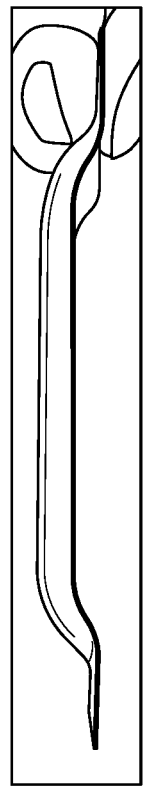
FIG. 5B is a drawing showing a side view of the HSC hinge of FIG. 5A.
Figure 5D:
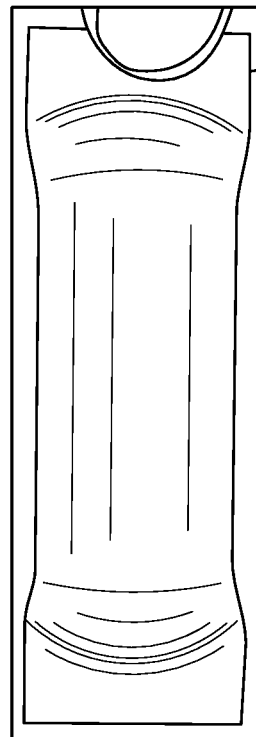
FIG. 5D is a drawing showing a bottom view of the HSC hinge of FIG. 5A.
Figure 5A:
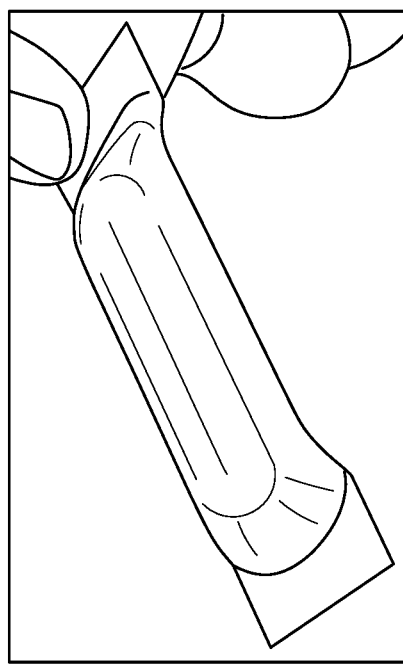
FIG. 5A is a drawing showing an isometric view of an exemplary HSC hinge according to the Application.
Figure 5C:
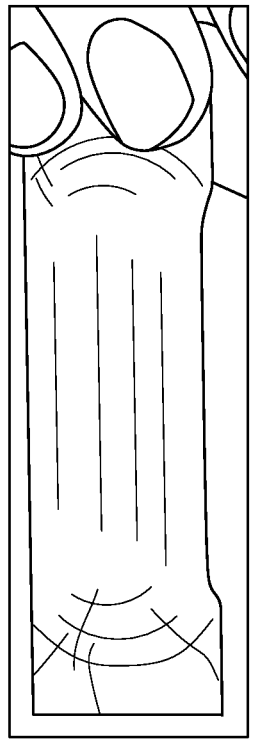
FIG. 5C is a drawing showing a top view of the HSC hinge of FIG. 5A.

FIG. 5A is a drawing showing an isometric view of an exemplary HSC hinge according to the Application. Any suitable transition section can be used. In the exemplary transition section of the HSC hinge of FIG. 5A, the transition section is a smooth tangential spline. The various radii of the smooth tangential spline reduce stress concentrations of the transition section of the HSC hinge. FIG. 5B is a drawing showing a side view of the HSC hinge of FIG. 5A. FIG. 5C is a drawing showing a top view of the HSC hinge of FIG. 5A. FIG. 5D is a drawing showing a bottom view of the HSC hinge of FIG. 5A.

Transition Section—The transition section is somewhat flexible to transition between the non-moving base flange (typically bolted to surface of the module) to the bending deformable hinge portion. The somewhat flexible transition section is less flexible than the bending hinge portion. The transition serves two purposes, slight flexibility to reduce stress or breakage during operation, and a substantially smooth radii, which allows for more efficient fabrication. For example, during R&D, some transition sections with closer to step function patterns were found to be more difficult to mold and form with composite construction techniques. By contrast, the relatively gentle rounds of the smooth tangential spline were much easier to manufacture, particularly where there is a molding step. The HSC hinge with a transition with a transition section on either side of the folding hinge portion is shorter than a clamped hinge of the prior art. Moreover, the HSC hinge is lighter and more positively locks into the mechanical open position.

Offset Hinges—Note also that these hinges are "offset hinges" in that the folding part of the deformable hinge section is in a different plane than the mounting flanges. The offset nature of the hinges is important to how the folding compressed modules stow against each other in a compact stowed state. The hinges used in structures according to the Application are sometimes referred to as composite flexure hinges (CFH).

Hinge Placement—In the folded state, the hinges will interfere with hinges from adjacent panels if they are not offset from one another longitudinally; that is to say that only one hinge can be present along a given longitudinal axis for any MOSSA configuration, otherwise the folded hinges will contact one another in the folded state. When looking at the figure of the folded MOSSA, it can be seen that the folded hinges are aligned adjacently and do not stack on each other. The MOSSA architecture allows for optimal hinge placement regardless of the MOS SA configuration. The problem of hinge stack-up in the folded state can always be resolved.

Figure 6B:
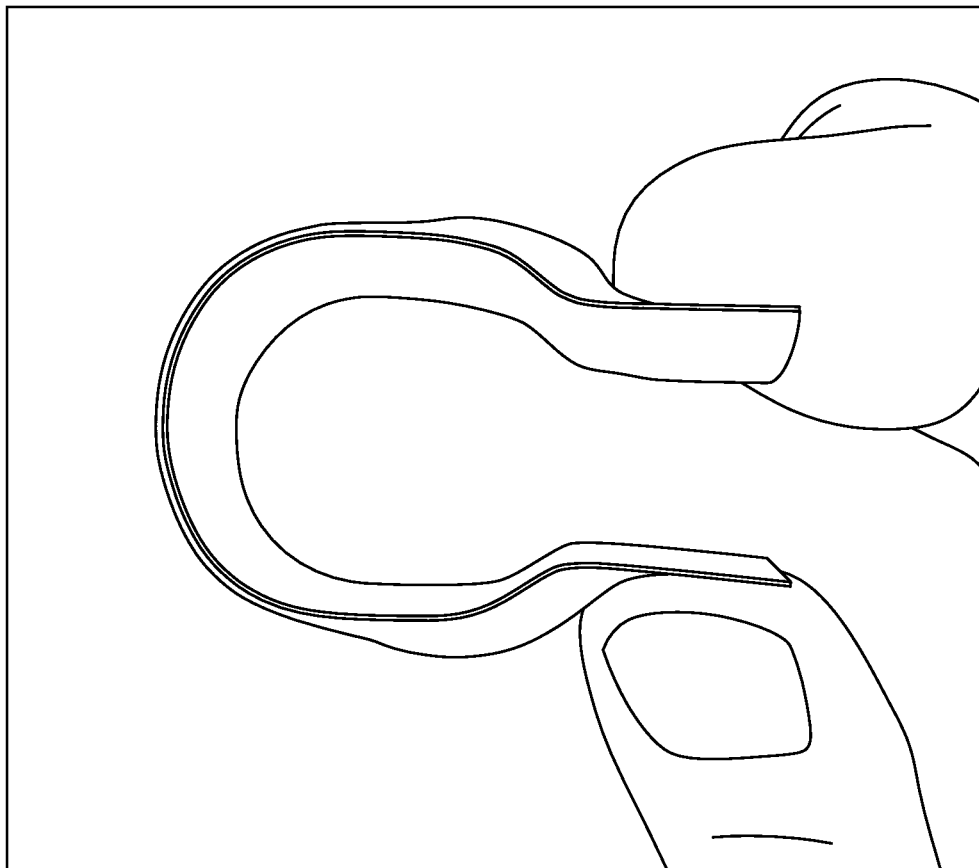
FIG. 6B is drawing of a folded HSC hinge according to the Application.
Figure 6A:
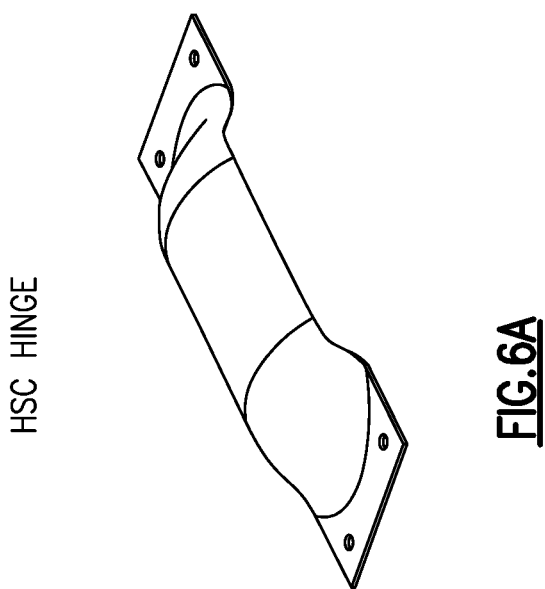
FIG. 6A is drawing of another HSC hinge according to the Application.

Self-Opening Hinge—FIG. 6A is drawing of another HSC hinge according to the Application. The HSC hinge according to the Application is a self-opening hinge. FIG. 6B is drawing of a folded HSC hinge according to the Application. When folded, the HSC hinge has a stored strain energy as a stored potential energy. A folded HSC hinge is thus spring biased to open, or spring biased towards an open hinge state.

Self-Locking Hinge—The HSC hinge according to the Application is a self-locking hinge. Once open, the HSC hinge, as a self-locking hinge, locks in the hinge open position, the hinge stored strain energy having been spent to open the hinge. Typically, the hinges remain open for the life of the hinge, such as in deployed MOSSA. However, the HSC hinges are reversible, such as for testing of a deployable MOSSA during ground manufacture before being deployed by spacecraft to orbit. To unlock a HSC hinge, the deformable cross section of the deformable hinge portion is pressed towards flat, and then the unlocked hinge can be again folded.

Number of Hinges—The number of hinges between modules can vary. For example, there can be more hinges between the modules near the root, the portion of the MOSSA that mechanically couples to a base, such as, the body of a satellite. In FIG. 1, for example, it can be seen that 6 hinges are used to affix the first module to the root. 4 hinges are used further out (not all hinges are visible in FIG. 1), and finally at the last three modules most distant from the root, there are four hinges between each module.

Now, in more detail, the stiffened thin panel MOSSA according to the Application provides a solution for the growing need for scalable, reliable, and low-cost next generation solar arrays for small spacecraft buses. The MOSSA can take advantage of high strain composite components to form a reliably deployable, lightweight, and scalable array structure with exceptionally low stow volume that morphs into a rigid structure upon deployment. Exemplary analysis, design, and prototyping for the described array through iterative design and prototyping of the specific array components is described in more detail hereinbelow. Exemplary high strain composite array components were designed and manufacturing methods for the component geometries were tested and implemented.

A full array was built, and deployment tested in a zero-gravity offloader. It was found that the stiffened thin panel array deployed reliably and safely, with consistent deployment kinematics after multiple deployment tests, and was robust through its deployment while becoming very rigid upon full deployment. The speed and deployment kinematics of a stiffened thin panel MOSSA and hinge according to the Application can be adjusted for specific mission needs and can be scaled for smaller or larger spacecraft. The described array is easy to manufacture, low-cost, reliable, scalable, and can achieve extremely low stow volumes, and lends itself to exceptional power density performance Subsequent generations of the Stiffened Thin Panel Array show promise to provide greater specific power, stiffness, scalability and customization, and easier and cheaper manufacturability.

The MOSSA is an advanced array architecture useful for spacecraft. MOSSA can use advanced solar array technologies for small spacecraft with power needs between 1 kW and 3 kW, and masses between 100 kg and 500 kg. The solar array solutions should be scalable, reconfigurable for various mission types, and have low stow volumes, all while maintaining power performance metrics that are competitive with current state-of-the-art solar array technologies. An exemplary MOSSA solution has a specific power of 200 W/kg and power density 129 of kW/m3.

The described MOSSA solution includes the structural elements of the array. Power system and modular photovoltaic architecture, such as, for example, those offered by SolAero of Albuquerque, NM, are suitable for use with a MOSSA. A unified at the panel and photovoltaic cell substrate interface has been developed. Opterus, the assignee of this Application, has developed and fabricated the thinned celled panel (TCP) in conjunction with SolAero, which was then delivered to SolAero to then populate with cells and provide an analysis of the power performance of the TCP.

The skeletal structure of the exemplary MOSSA is made (nearly) entirely of high strain composite (HSC) components, which are thin, fiber-reinforced polymer materials that perform under high deformation and can assume multiple shapes. HSC structures permit extremely low mass and stowability, while maintaining the ability to become rigid upon deployment. Due to the low mass and rigidity of HSC structures, the array wings can still be articulated easily while only marginally increasing the polar moment of inertia of the spacecraft. The nature of HSC structures provides for a very low stow volume, allowing for much more efficient use of spacecraft bus space.

One exemplary MOSSA is a 3-panel rectangular panel array that makes use of HSC components. The photovoltaic cells are adhered to thin composite sheets that are set into panel frames that are part of the underlying array structure. The panel frames that support the solar cells and cell substrate are stiffened upon deployment by HSC stiffening ribs that expand during deployment to drastically increase the cross-sectional moment of inertia (stiffness) of each panel. The panel sections are joined to one another via HSC hinges that, once folded, store strain energy to allow the MOSSA to be deployed by strain energy only.

An experimentally implemented prototype MOSSA and its components were used to assess the deployment kinematics of the array via offloader testing. The development of a testable MOSSA prototype included multiple iterations of the geometric design and manufacturing procedures of each component. Geometric and material design of each component included consideration of factors, such as, ease of manufacturability, and performance. The TCP, panel frames, hinges, and stiffening ribs were modelled and manufactured iteratively until the desired functionality of each component was demonstrated, and the component could be manufactured easily and reliably.

Experimental implementations of the first-generation MOSSA solar array and subsequent testing of the prototyped array yielded very favorable results. A 3-panel array was easy to assemble after all the components had been fabricated and performed better than expected during testing. The array was stiffer and more structurally robust than anticipated and deployed with consistent kinematics over many deployment tests. Deployment was safe and reliable, such that no panel faces contacted any other panel faces, which is indicative of solar cell damage. The panels of the example MOSSA are 23"×23" square panels and all 3 panel sections can be z-folded to a thickness of ¼", lending to a stowed volume of around 133 in3 (0.0022 m2). Power metrics delivered from SolAero show that with the given TCP developed for this phase, each panel can output 94.56 W, totaling 283.68 W per 3-panel array. Each array weighs a total of nearly exactly 2 kg, providing for a specific power of 141.84 W/kg for the first-generation MOSSA. However, the power density of the array, given the power output and stow volume, is 129 kW/m3, far exceeding expectations.

Through this investigation it was found that the MOSSA is a viable array solution for the next generation of advanced solar arrays and shows excellent potential for improvement, especially in the areas of mass reduction and power output. Reduction in TCP mass, as well as increased TCP area by redesign of the MOSSA panel frame and the TCP-panel frame interface will increase the specific power and power density of the array, and the incorporation of bonded hinges will further reduce the parasitic mass of the array by reduction of the hinge fastening mass.

Advanced space technologies are rapidly increasing across the world, and world powers are beginning to aggressively enter the aerospace and spacecraft domains. Small and advanced spacecraft are expected to become extremely valuable for use in emerging spacecraft technologies. For example, development of advanced solar array system for use on small spacecraft buses are of considerable interest. Such arrays will power spacecraft typically between 500 kg and 1000 kg and provide 1-3 kW of total power from one or multiple array wings, while having a specific power of at least 200 W/kg and a power density of 30 kW/m3. These arrays should be easily scalable to larger sized missions and will require some degree of modularity, with an emphasis on low stow volumes.

This Application describes an array architecture for a stiffened thin panel MOSSA. The array makes extensive use of high strain composites and their advantages as structural materials. The MOSSA can be as small as a 3-panel array including of square panels that "morph" or transform, from an extremely flat stowed state into a rigid panel upon deployment such as is illustrated by FIG. 3. This morphing is achieved via the use of high strain composite "stiffening ribs", that increase the stiffness of the deployed panel, and high strain composite hinges that allow the array to deploy by means of stored strain energy only. The design of the MOSSA system eliminates the need for expensive and heavy motor driven mechanisms and the need for metallic components, while simultaneously increasing deployment reliability and decreasing cost and stow volume. Additionally, the nature of using high strain composite components allows for the opportunity for excellent scalability and modularity.

Components of an MOSSA according to the Application include stiffening ribs, panels, and a cell substrate called the Thinned Celled Panel (TCP). The stiffening ribs allow the panels to morph between the flat stowed configuration and the stiffened deployed configuration, in part, by increasing the panel depth during deployment. The hinges allow for the array to stow flat and deploy via strain energy. The panels act as the principal structure for which the stiffening ribs and hinges are mounted to. When combining the individual functions of each component into one assembly the MOSSA functions as a self-deploying platform, typically, to hold photovoltaic cells in place on a spacecraft.

Structural components of the MOSSA can include high strain composite pop-out stiffening ribs (called Double-Sigmoid Springs (DSS)), top and bottom panel frames that are conjoined together with the stiffening ribs, hinges that connect the panel assemblies together and allow for folding of the array, and the Thinned Celled Panel (TCP) that carries the photovoltaics and is interfaced into each top panel.

Top and Bottom Panel Frames—The main, and largest, structural components of an MOSSA are the top and bottom panel frames. These frames are both substantially identical in footprint, but differ in their function and cross-sectional geometry. The top panel frame is designed to accept the TCP and hold it rigidly in place upon deployment as well as form the structure for which the stiffening ribs adhere to in order to allow the panel assembly to morph upon deployment and increase in depth.

Figure 7A:
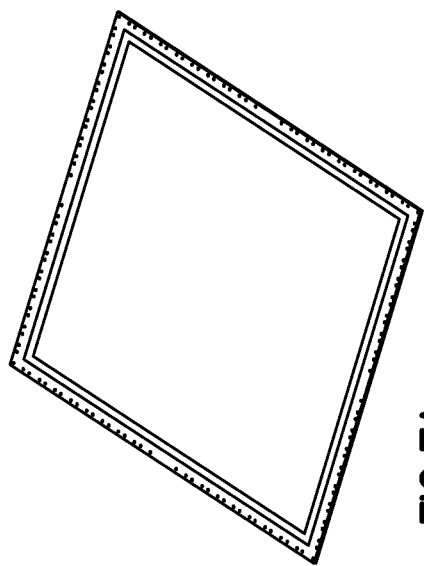
FIG. 7A is a drawing showing a model of an exemplary top panel frame.
Figure 7B:
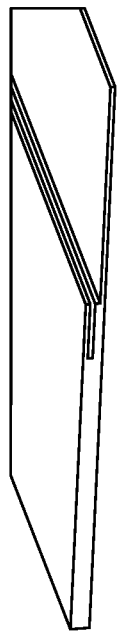
FIG. 7B is a drawing showing a cross-section of an exemplary top panel frame.
Figure 7C:
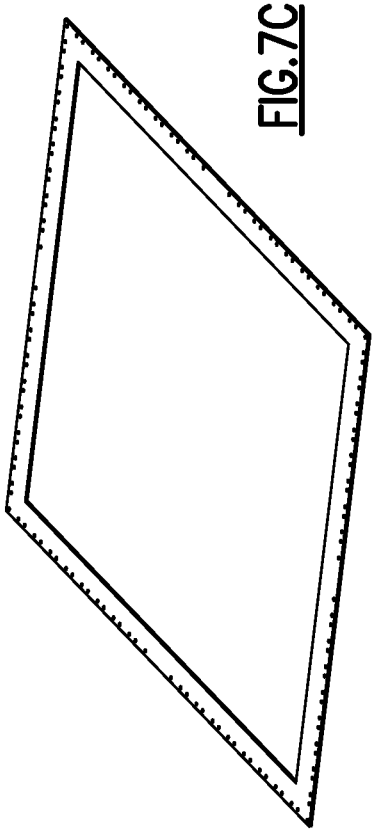
FIG. 7C is a drawing showing a model of an exemplary bottom panel frame.

FIG. 7A-FIG. 7C show exemplary panels. FIG. 7A is a drawing showing a model of an exemplary top panel frame. FIG. 7B is a drawing showing a cross-section of an exemplary top panel frame. FIG. 7C is a drawing showing a model of an exemplary bottom panel frame. The top panel frame has cutouts that are cured into the laminate via the use of removable shims that are applied during the layup process and removed upon full cure of the part. The panel frames are made of 10 layers of 64 gsm (grams per square meter) spread-tow plain-weave carbon fiber strips (with a 0/90° fiber orientation) and are 23"×23" in footprint. The laminate is laid up on a 24"×24" precision ground aluminum plate and vacuum bagged and cured directly onto the plate.

Figure 8:
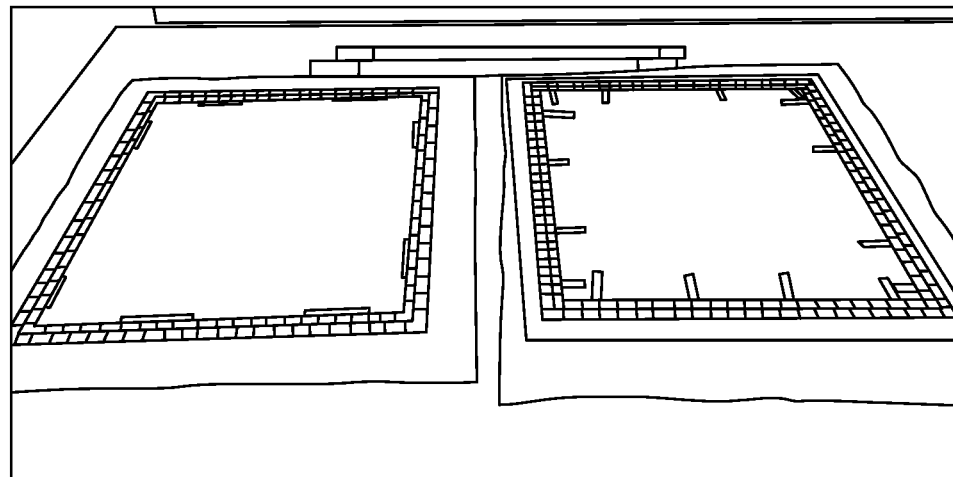
FIG. 8 is a drawing showing an exemplary panel frame layup.
Figure 9:
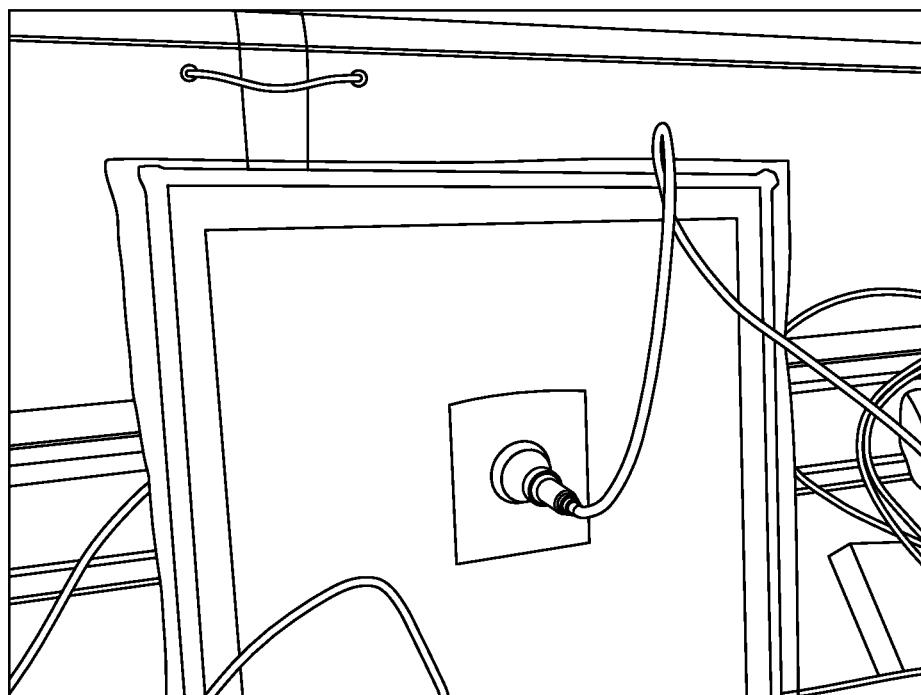
FIG. 9 is a drawing showing a panel frame vacuum bagged and prepared for cure.

FIG. 8 is a drawing showing an exemplary panel frame layup. FIG. 9 is a drawing showing a panel frame vacuum bagged and prepared for cure. Once the part has been cured, the edges of the panel frames are sanded square and flush with the other panel frames used in the array assembly and then the hinge mounting holes are drilled using a 3D printed drill tool. This was done via hand-sanding the panel frames as a stack to ensure each panel is flush with the other and then using a carbide drill bit to drill through holes through all the panels as a stack.

Figure 10:
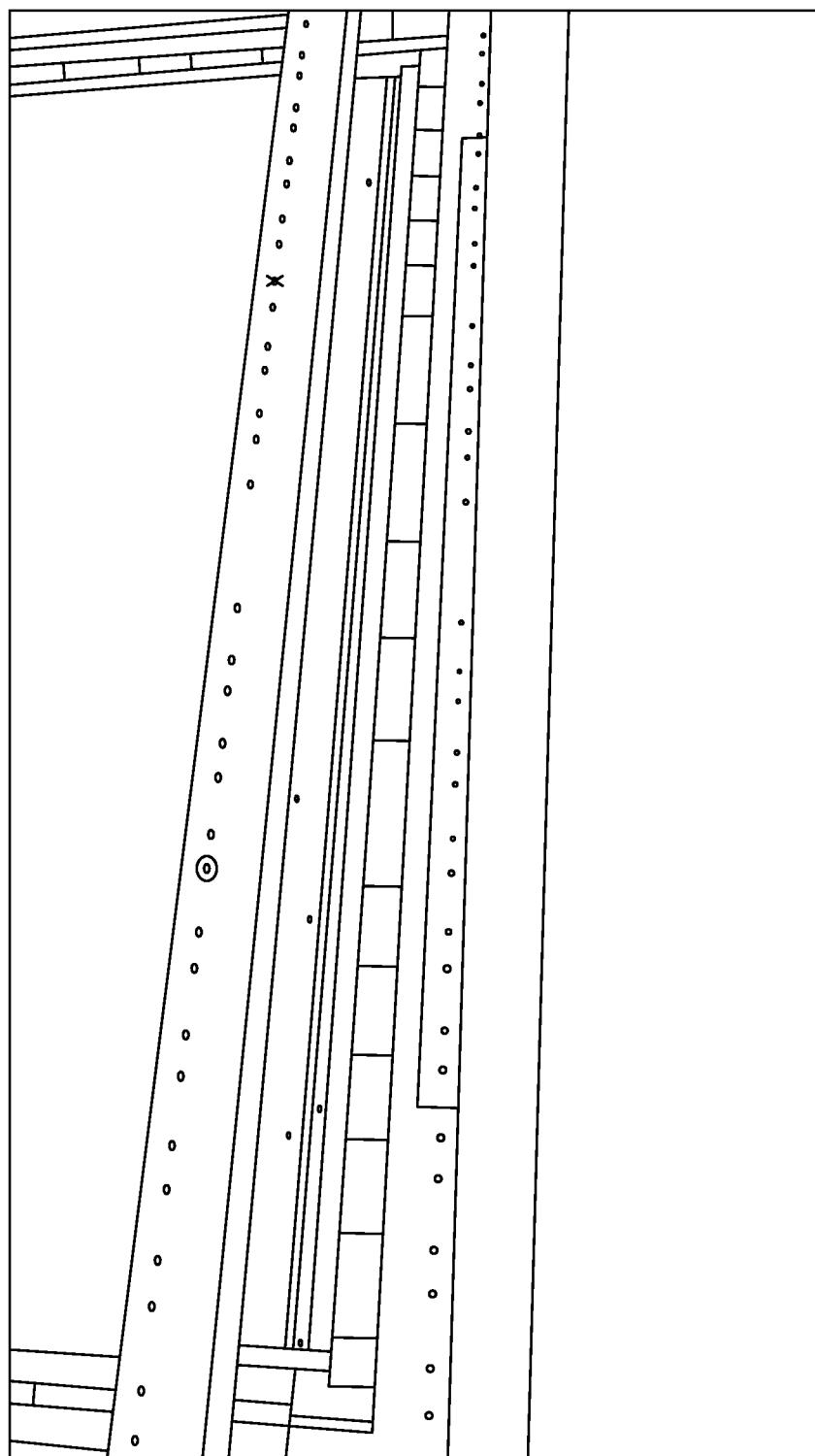
FIG. 10 is a drawing showing sanding and drilling of panel frames.

FIG. 10 is a drawing showing sanding and drilling of panel frames. Panel frames (3 top and 3 bottom panel frames), were set squarely underneath a stiff board and clamped together. 180 grit sandpaper was used to sand the edges of the panels until they were square with one another and fit the 23"×23" specified dimension. After sanding was completed, the drill tool was clamped over the stack and the holes were drilled. The final panel frames are 23"×23" square and have through holes along the desired edges to allow for hinges from adjacent panels to be mounted.

Stiffening Ribs (Pop-Out)—More generally, a stiffening rib suitable for use in a MOSSA according to the Application, can have any cross-sectional geometry that permits the top and bottom mounting faces to translate substantially only vertically relative to each other. That is, when the stiffening rib expands from a collapsed to an extended state, the mounting faces typically do not substantially translate parallelly relative to each other.

Double Sigmoid Springs (Pop-Out Stiffening Ribs)—The pop-out stiffening ribs are the component of the array that allow for the top and bottom panel frames to morph and increase in depth. The pop-out stiffening ribs provide the energy required to separate the top and bottom panels, thereby increasing the moment of inertia and stiffness of the module assembly. On deployment, the pop-out stiffening ribs provide the energy to increase the moment of inertia of the panel assemblies to increase their stiffness.

This array component posed the most difficult design challenges. The geometric design needed to achieve the desired functionality, the manufacturing process to produce the desired geometry, and the material selection for the proper spring stiffness were each their own exceptional challenge and many iterations of geometry, material and mold tooling were designed and fabricated. The spring design of the experimental implementation has a cross-sectional geometry resembling two sigmoid curves bonded together, hence the name Double-Sigmoid Springs (DSS). The reason for this geometry is because the flanges of each spring (flat areas of the springs that are bonded to the panel frames) should not shift laterally relative to each other, otherwise the panel assemblies will not collapse. The exemplary springs are 20" in length to avoid interference with the other springs in the panel assembly during compression.

Figure 11:
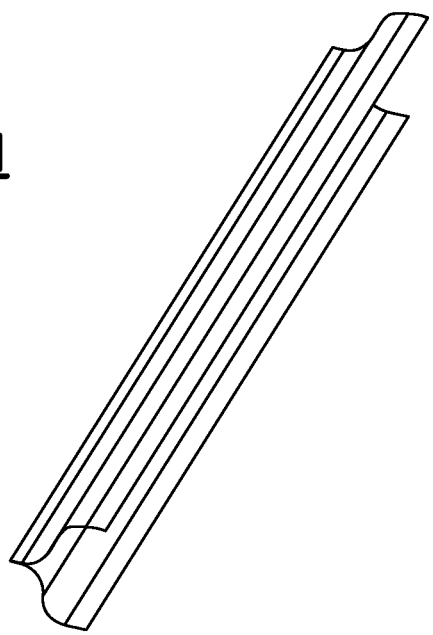
FIG. 11 is a drawing showing an exemplary model of a DSS.
Figure 12:
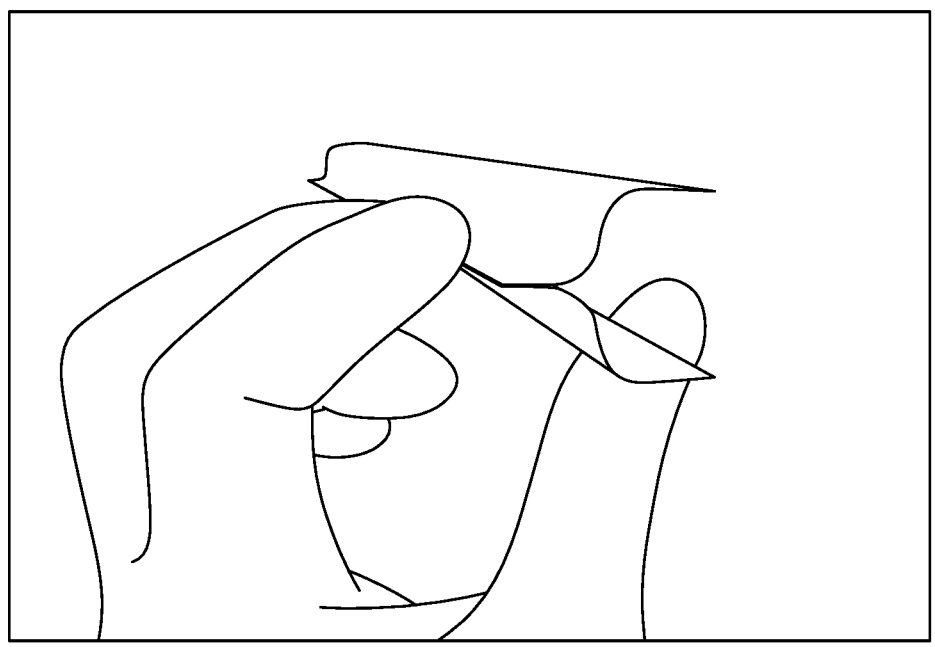
FIG. 12 is a drawing showing an exemplary Double Sigmoid Spring (untrimmed)

FIG. 11 is a drawing showing an exemplary model of a DSS. FIG. 12 is a drawing showing an exemplary Double Sigmoid Spring (untrimmed). The exemplary DSS are made of two plies of 100 gsm plain weave carbon fiber, oriented at a ±45° fiber orientation, and only co-cured at the spine of the spring. The layup procedure is complex in design, yet easy to execute. The lamina was laid up on a top of two aluminum shims that were joined at the seam with PTFE tape. The shim and PTFE assembly were folded in half and the lamina were laid up on each side while extending beyond the edge of the fold line by 0.4", which allowed for the two plies of carbon fiber to come together at the spine of the spring. A semi-permeable release film and fully permeable breather was applied to the outside of the laminate.

The mold tooling used to mold the exemplary springs is a set of 3D printed bottom molds that are bonded to a 1"×1" aluminum square tube and a set of 3D printed top molds that are clamped over top of the springs with Kevlar hook and loop straps after vacuum bagging. The molds were 3D printed using stereolithography and printed out of high-temperature resin so the mold tooling can withstand the high temperature required to cure the laminate. The top mold tooling set was designed to accept ⅛" thick aluminum bar that spans the length of the spine of the spring to keep the spine straight during the cure.

Figure 13:
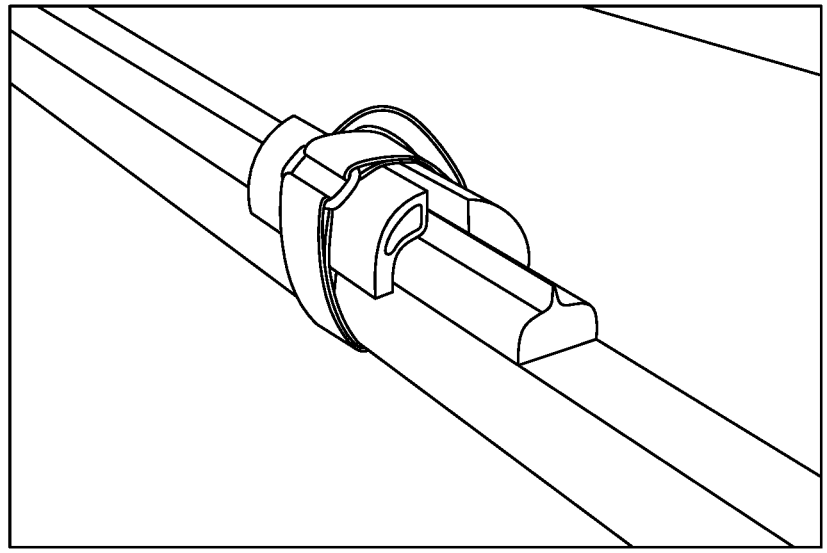
FIG. 13 is a drawing showing an exemplary DSS mold tooling.
Figure 14:
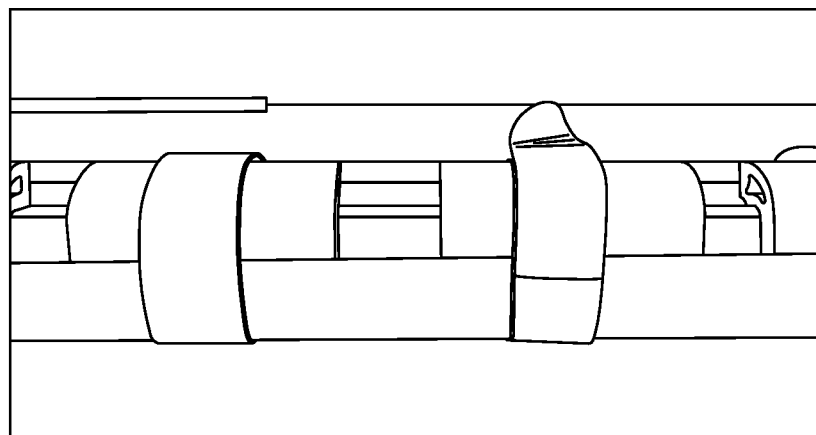
FIG. 14 is a drawing showing a DSS laminate ready for cure.
Figure 15:
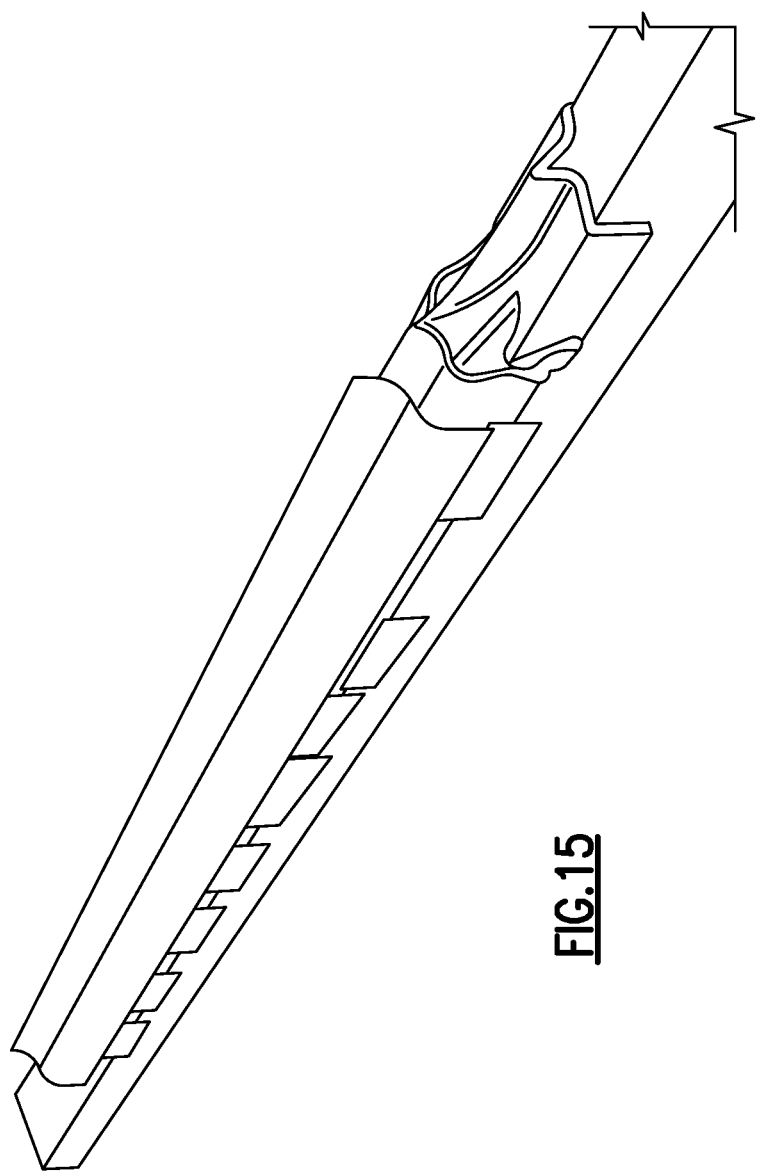
FIG. 15 is a drawing showing a cured DSS still on a bottom mold.

FIG. 13 is a drawing showing an exemplary DSS mold tooling. FIG. 14 is a drawing showing a DSS laminate ready for cure. FIG. 15 is a drawing showing a cured DSS still on a bottom mold. After the springs were cured, each spring was trimmed to the specified dimensions via a 3D printed trim tool and a ¼" shaft flush-cut diamond coated router bit. The 3D printed trim tool accepted the cross-section of the DSS, which was then slid through the tool while the tool was held against the router. As the DSS passes through the tool the exposed regions of the DSS were trimmed away, leaving an accurately dimensioned spring.

Figure 16:
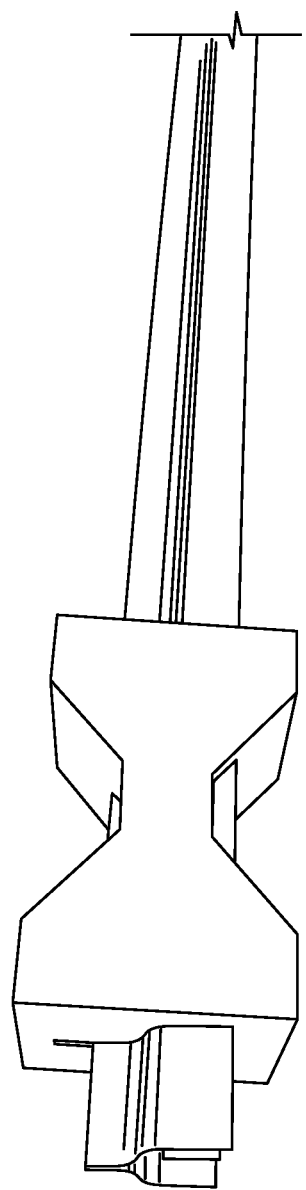
FIG. 16 is a drawing showing an exemplary DSS in a trimming tool.

FIG. 16 is a drawing showing an exemplary DSS in a trimming tool. Once trimmed using the trim tool, four DSS were bonded simultaneously between the top and bottom panels to form a panel assembly. This is shown in FIG. 13, below.

Figure 17:
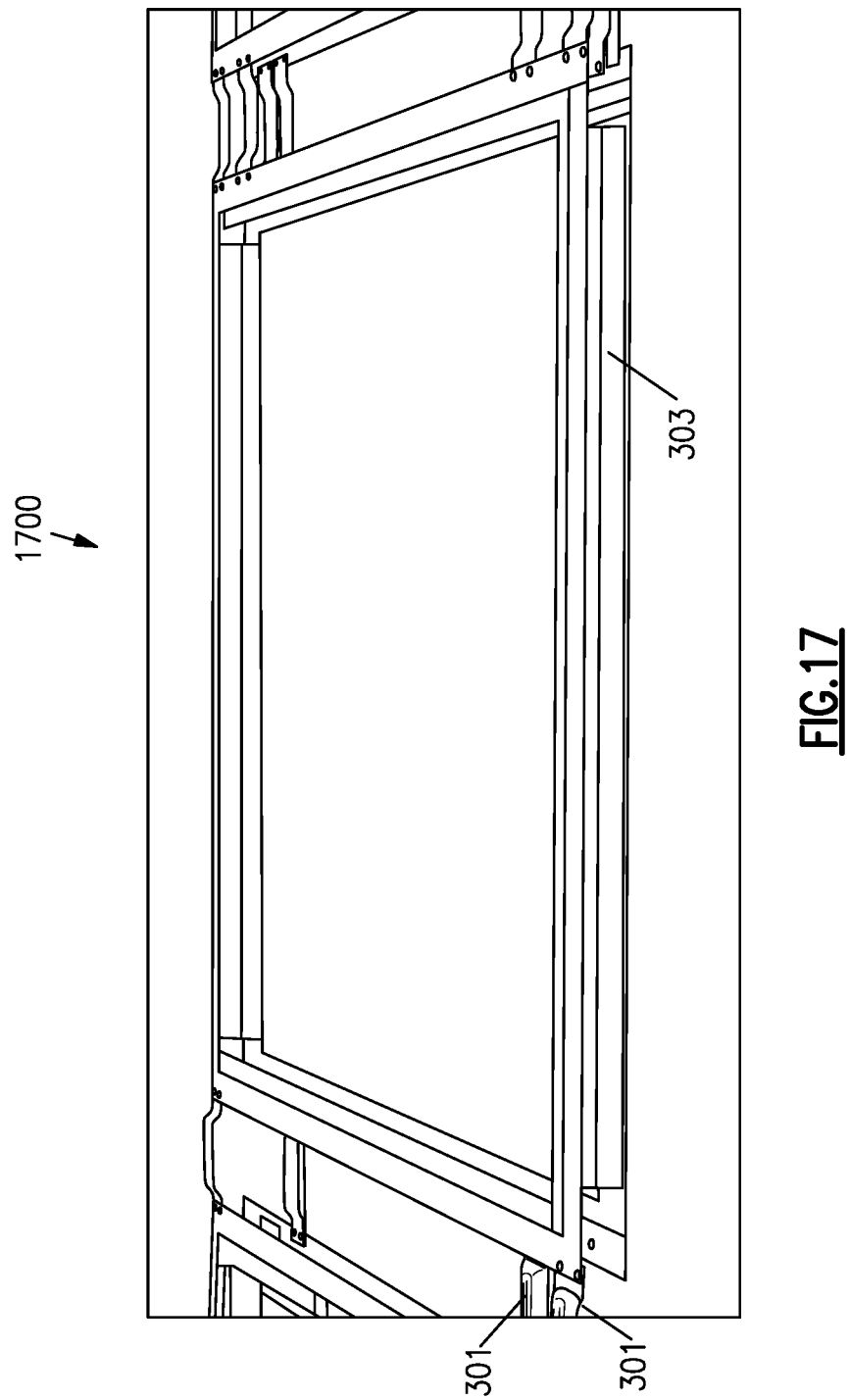
FIG. 17 is a drawing showing an exemplary panel assembly.

Hinges—FIG. 17 is a drawing showing an exemplary panel assembly. The hinges (affixed to the left and right sides of the panel) provide the array with the ability to fold and provide a structural connection between panel assemblies after full deployment. The geometry of the hinges is driven by the need for the hinges to be out of the way of the collapsed panels during stowage, thus the hinges are molded to hinge at their center and be offset from the plane of the panels. These hinges were made of 2 layers of unidirectional carbon fiber oriented along the long axis of the hinge, and 1 layer of plain weave quartz oriented at a ±45° fiber orientation relative to the long axis of the hinge.

Figure 18:
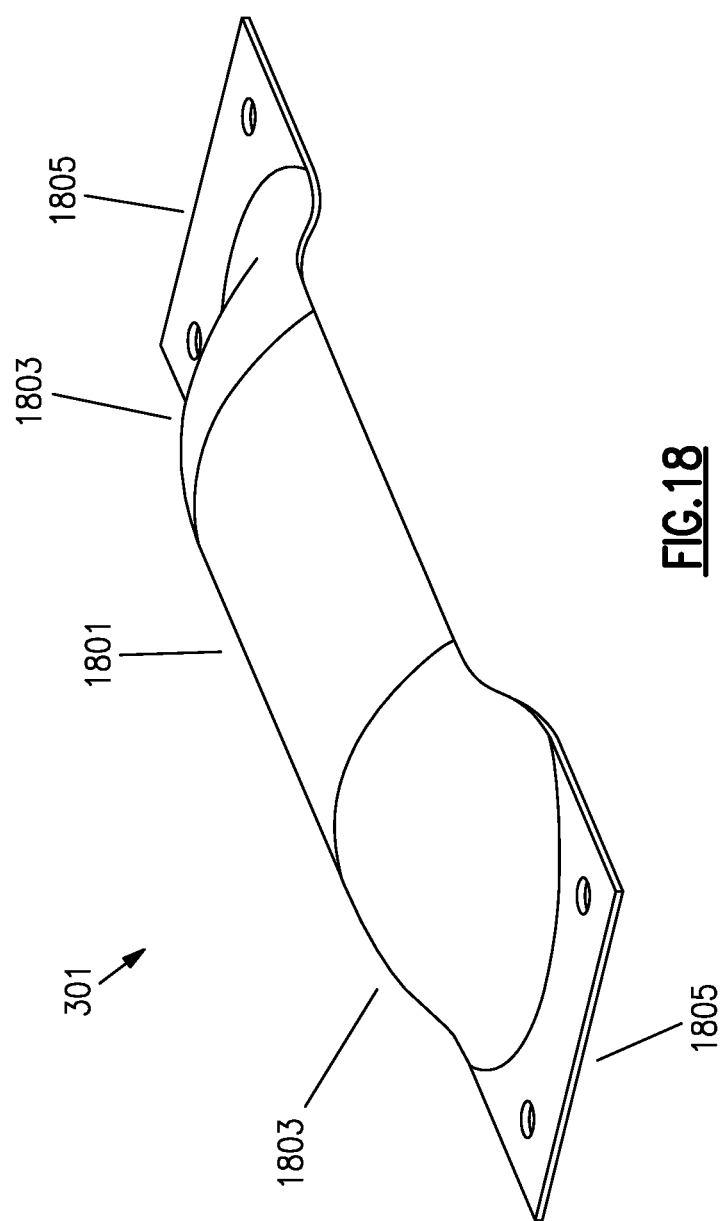
FIG. 18 is drawing showing a model of an exemplary hinge according to the Application.

FIG. 18 is drawing showing a model of an exemplary hinge according to the Application. A high temperature 3D printed mold is sealed and release to prevent the part from curing onto the mold. The laminate is laid up directly onto the mold, and a heat gun is used to soften the laminate to allow it to form onto the contours of the mold. After molding, a semi-permeable release ply is applied over the laminate followed by felt breather to mitigate the transfer of vacuum bag wrinkles onto the part.

Figure 19:
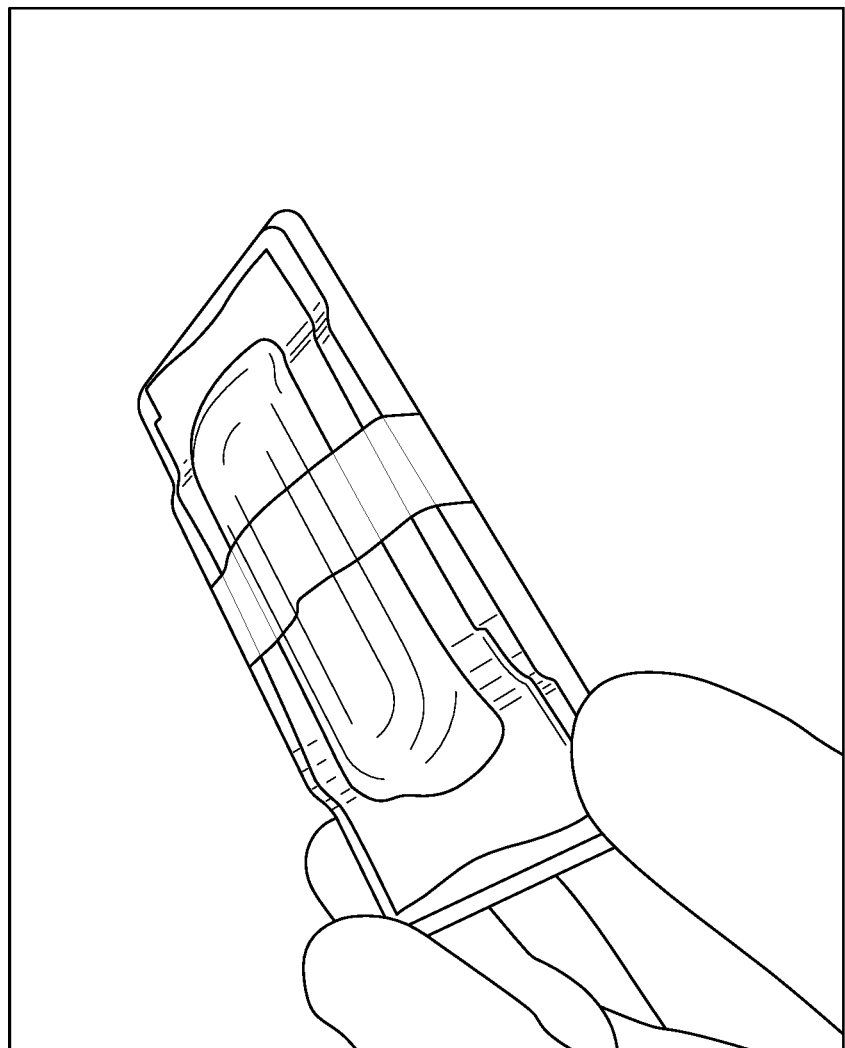
FIG. 19 is drawing showing an exemplary hinge laminate layup on a mold.
Figure 20:
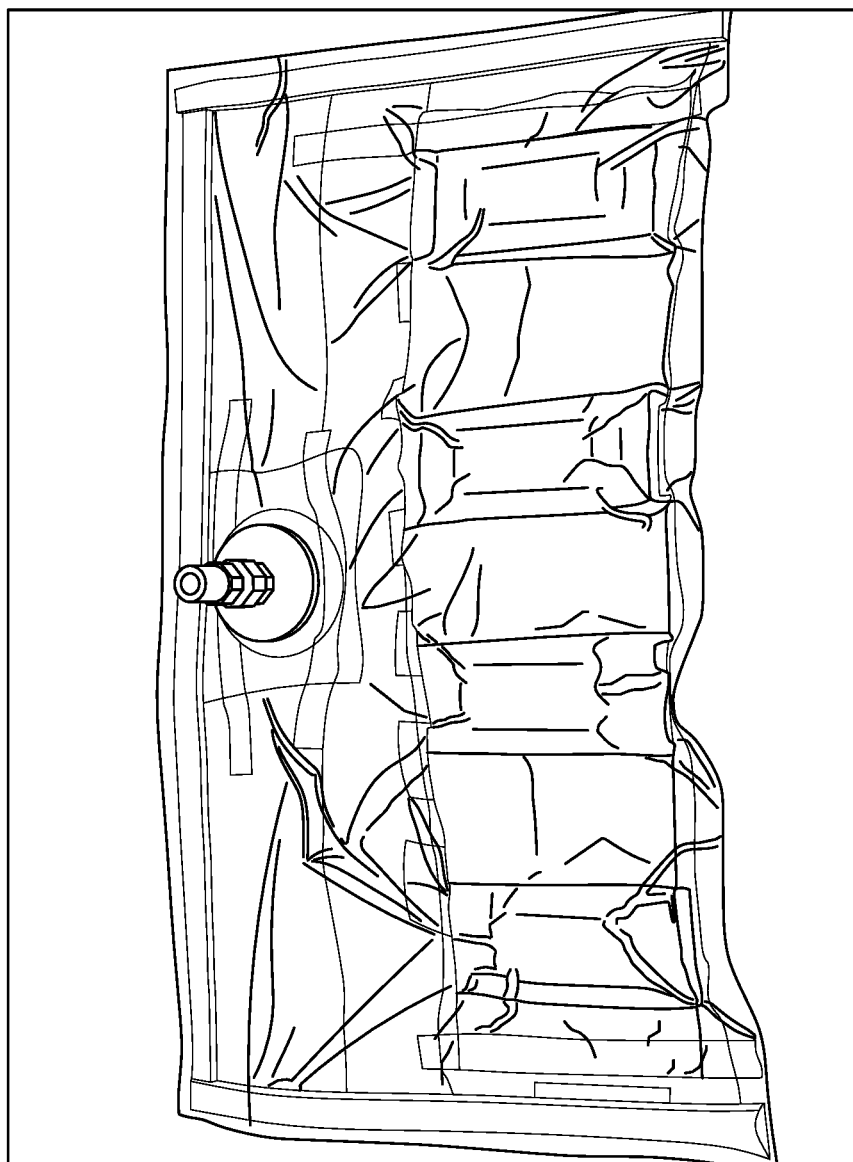
FIG. 20 is a drawing showing four hinges in bagging after cure.

FIG. 19 is drawing showing an exemplary hinge laminate layup on a mold. FIG. 20 is a drawing showing four hinges in bagging after cure. Once the hinge has been cured, it should be trimmed and drilled to meet the specified geometry and be able be fastened to the panel frames. This was done with a 3D printed trim/drill tool similar in function to the trim tool used with the DSS. The hinge was clamped between a male and female trim tool and then the excess of the hinge that protrudes from the tool was routed away with a flush-cut router bit. In the same operation, the through holes were drilled with a carbide bit. The prototype hinge could only be drilled one side at a time, so the hinge was taken out of the tool, flipped around, and the clamped in the tool again.

FIG. 21 is a drawing showing a hinge being trimmed and drilled with trim tool.

FIG. 22 is a drawing showing a partly (left) and fully trimmed and drilled hinge (right). Thinned Celled Panel (TCP)—The exemplary TCP is an assembly made of a thin composite panel substrate and the photovoltaic cells. The solar cells, also called coverglass interconnected cells (CICs), are adhered to a 21.5"×21.5" panel made of 2 plies of plain weave quartz oriented at a 0/90° fiber orientation. The TCP is held in the array by the top panel frames. Layup of the TCP laminate was done directly onto a precision ground 24"×24" aluminum plate and then vacuum bagged. IMM-α cells are but one example of solar cells suitable for use in a MOSSA according to the Application. FIG. 23 is a drawing showing an exemplary IMM-α cell. FIG. 24 is a drawing showing an exemplary TCP.

Panel MOSSA Assembly and Testing—With all components manufactured, the MOSSA was assembled. The nature of using few basic components allows for exceptionally modularity and the MOSSA can be assembled in any desired configuration. For the experimental implementation, assembly procedures included fastening the panel assemblies together via the hinges. For the experimental implementation, size #2-56 button head cap screws and low-profile nuts were used to mount the hinges to the panels. The exemplary TCP is retained in the top panel by thin retaining strips that slot into the cut outs of the top panel and overlap onto the TCP. The experimentally implemented TCP was also adhered to the top panel with low-strength adhesive to allow for removal of the TCP if necessary.

Figure 25:
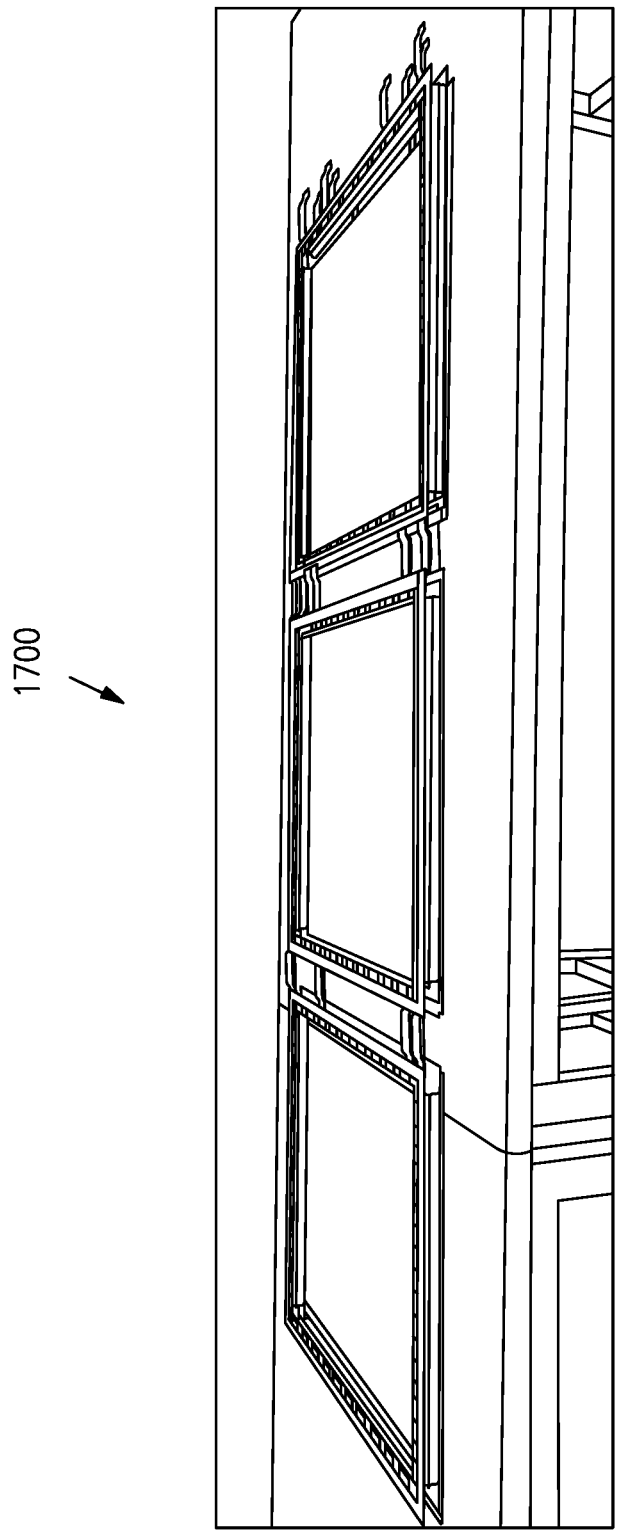
FIG. 25 is a drawing showing an exemplary 3-Panel MOSSA according to the Application.
Figure 26:
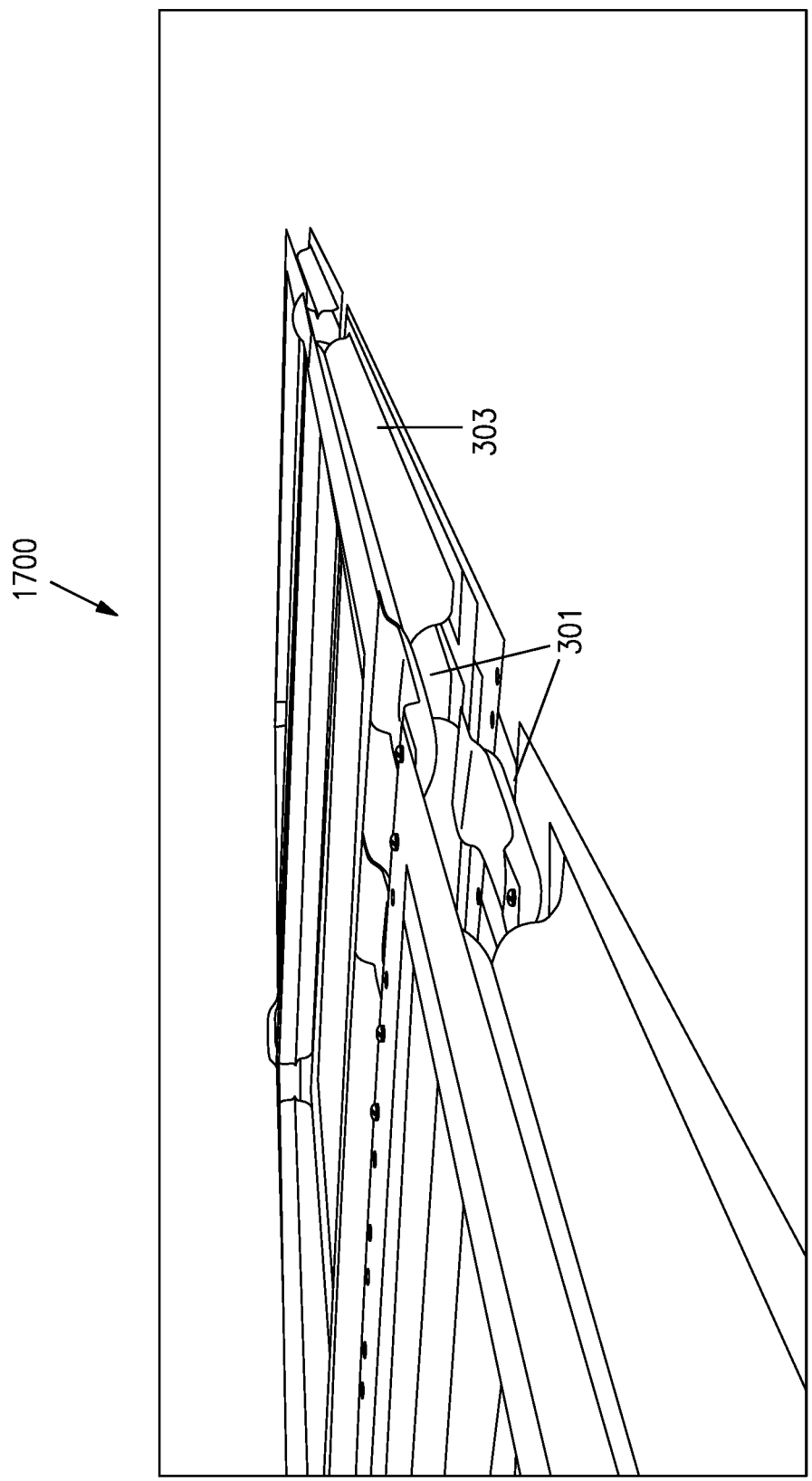
FIG. 26 is a drawing showing a close up view of the MOSSA of FIG. 24.
Figure 27:
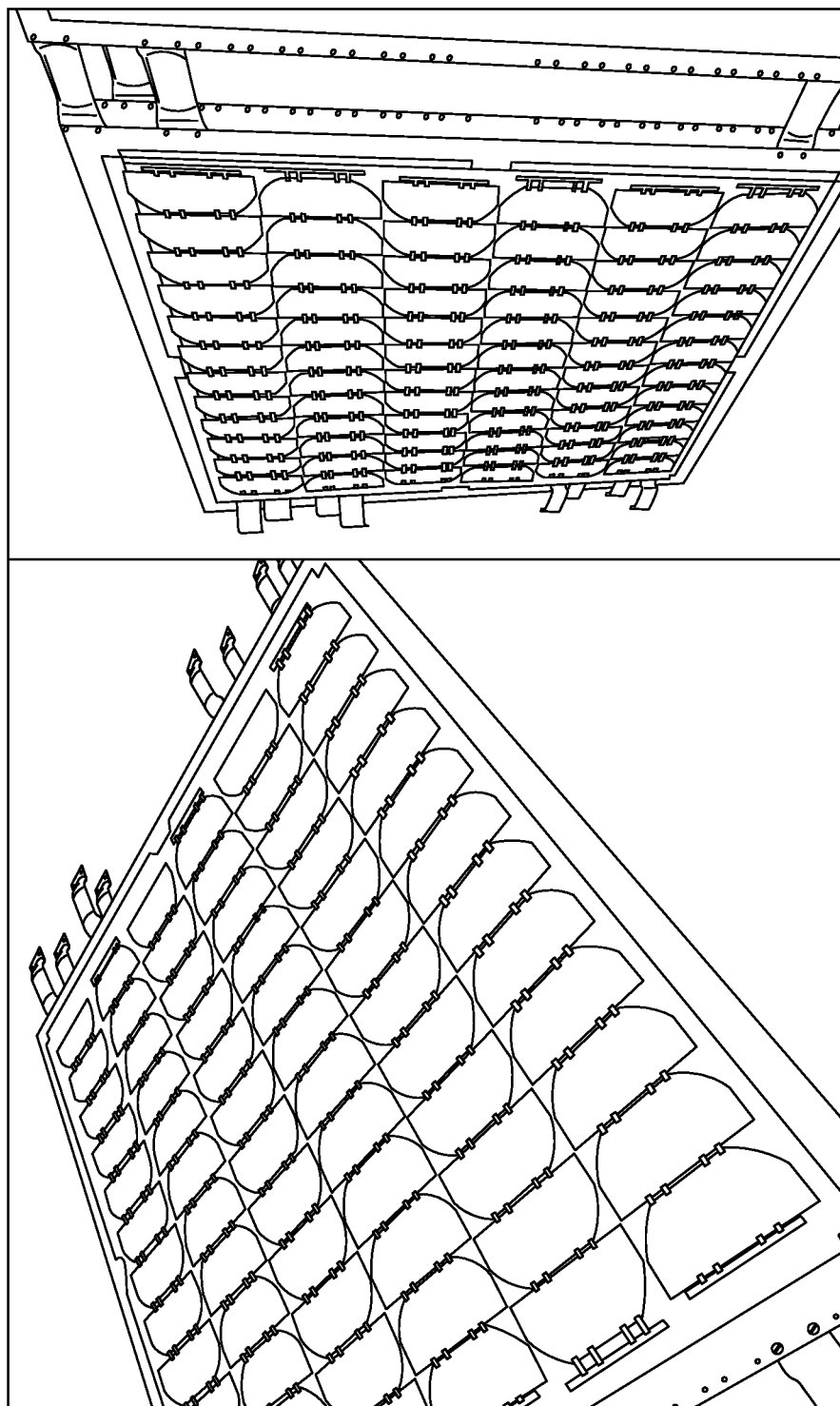
FIG. 27 is a drawing showing an exemplary MOSSA with a TCP fastened to a panel assembly.

FIG. 25 is a drawing showing an exemplary 3-Panel MOSSA according to the Application. FIG. 26 is a drawing showing a close up view of the MOSSA of FIG. 27. FIG. 24 is a drawing showing an exemplary MOSSA with a TCP fastened to a panel assembly.

After assembly of the MOSSA, the array can be loaded into a single axis offloader, and deployment tested. The hinges of the exemplary MOSSA only allow for a z-folded stowed configuration and folding of the array was done by bending the hinges and compressing the panels together until the DSS stiffening ribs are flat. The array was restrained along the panel frame perimeter and then released to simulate deployment on orbit. To avoid vibrational complications with the TCP during launch, the array restrain can include a rigid cross-braced front panel with cup/cone features along the perimeter and at the center. The cup/cone features will typically be identical on each panel and TCP, ensuring damped contact between the TCPs and panel frames. The cross-braced front panel will hinge away from the array upon deployment. Array restraint consolidation and deployment can be handled, for example, via a single non-explosive actuator (NEA) bolt.

Figure 28:
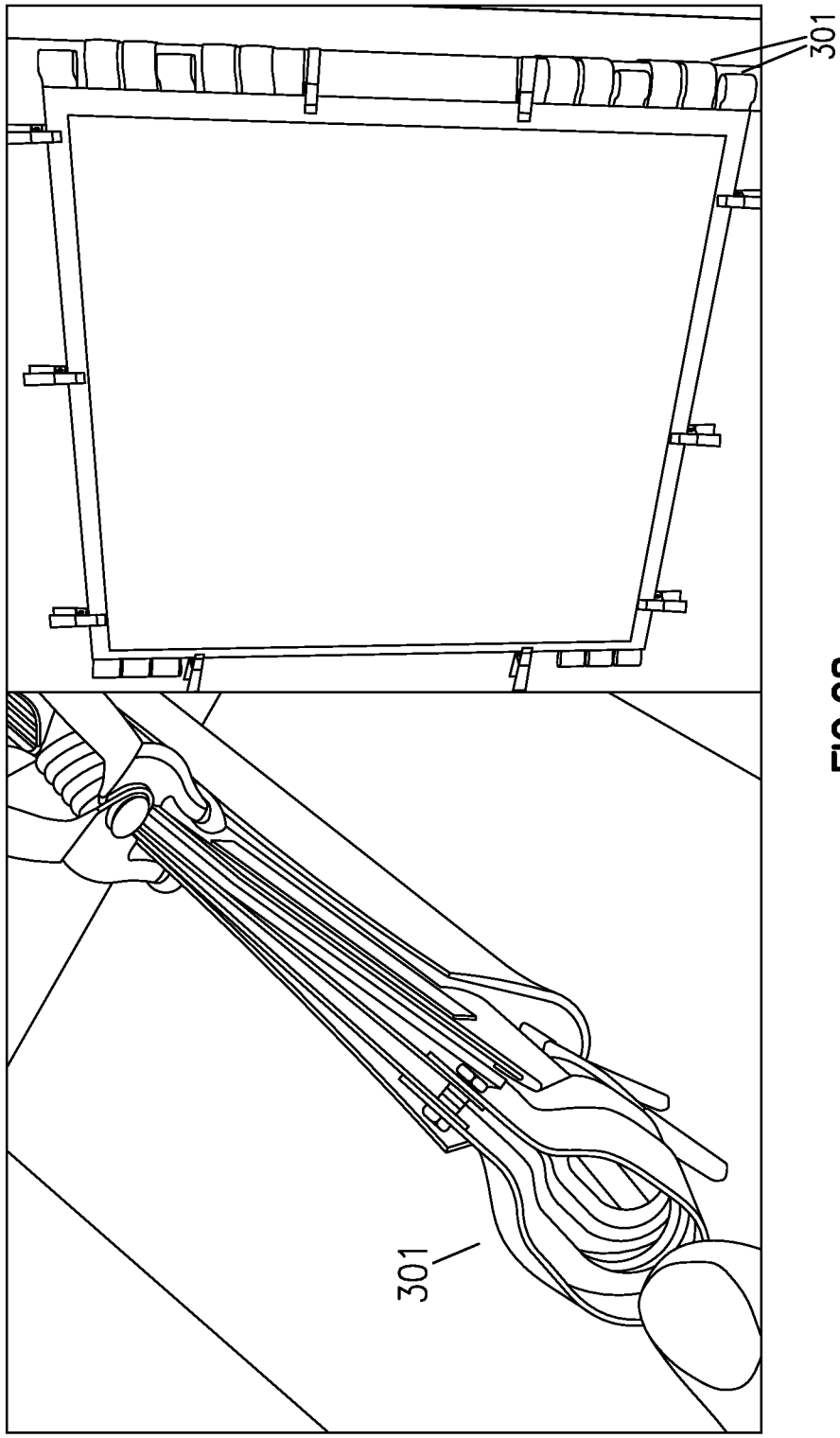
FIG. 28 is a drawing showing an exemplary MOSSA in a stowed state.
Figure 29:
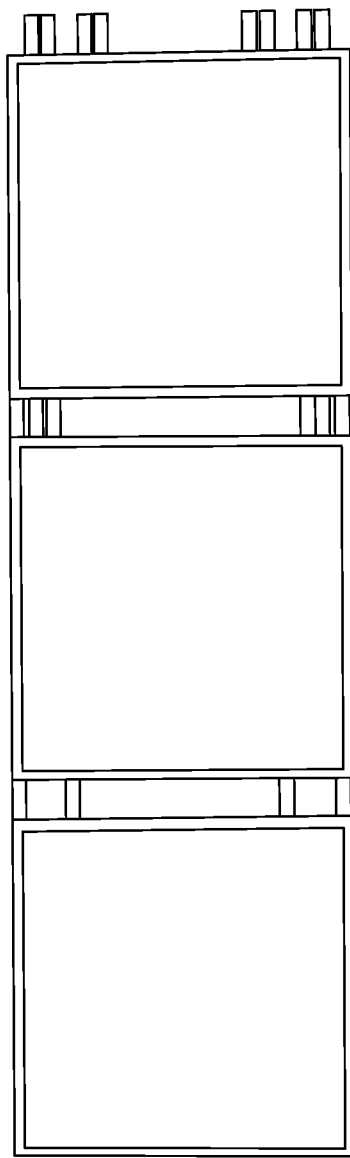
FIG. 29 is a drawing showing the MOSSA of FIG. 28 in a deployed state.

FIG. 28 is a drawing showing an exemplary stowed MOSSA. FIG. 29 is a drawing showing the MOSSA of FIG. 28 now deployed, while suspended in an offloader test fixture.

Power Performance Example—The final mass of the entire structure of the exemplary array (excluding the TCPs) is 473 g while the exemplary TCP has a mass per unit of 511 g, indicating that the structural elements of the array are ⅓ the mass of the solar elements. 40% of the TCP mass is from the CICs, while 42% of the TCP mass is from the TCP substrate itself. The fully assembled 3-panel MOSSA, including 3 TCP assemblies, is calculated to be at almost exactly 2 kg.

Figure 31:
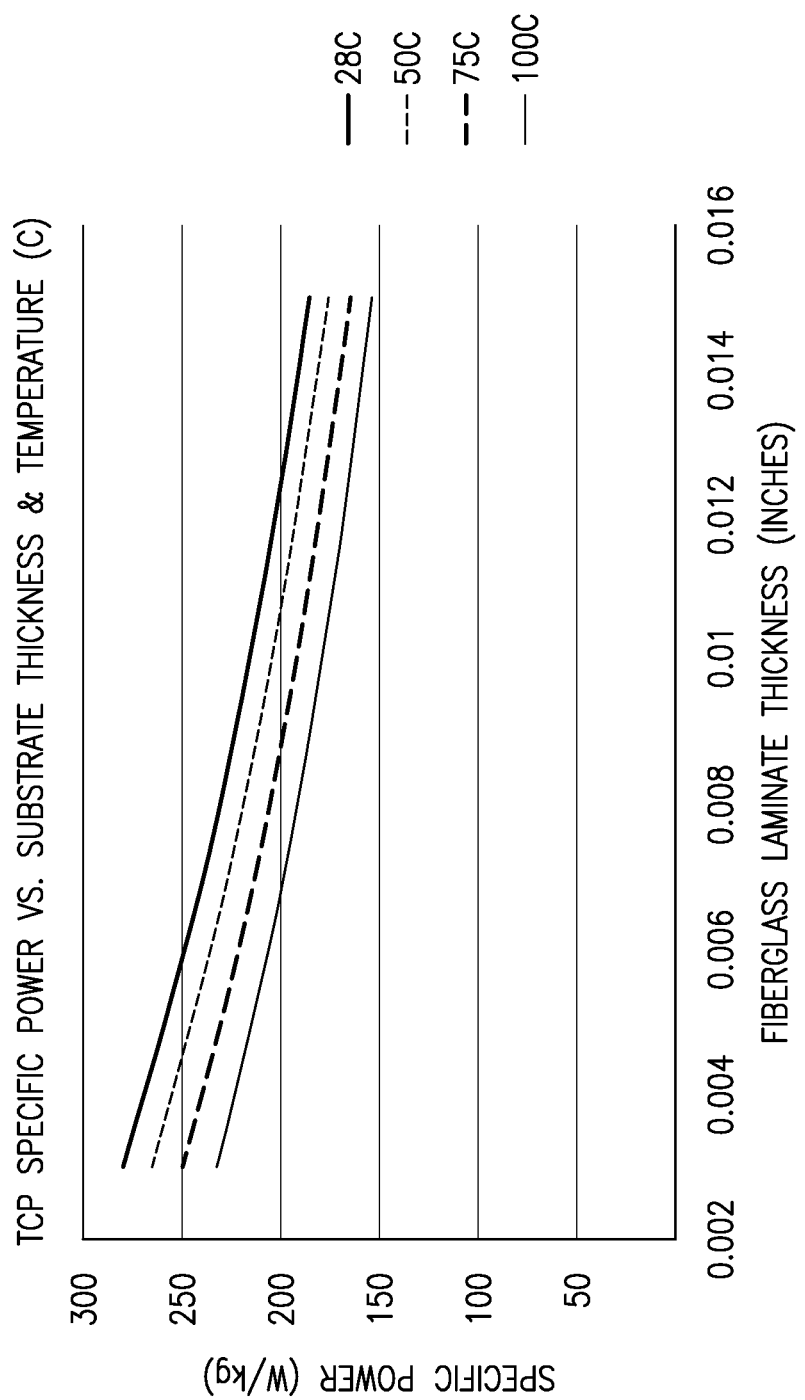
FIG. 31 is a graph showing how TCP substrate thickness (thereby mass) effects the specific power of the TCP.

FIG. 30 is a table showing an exemplary TCP mass breakdown. FIG. 31 is a graph showing how TCP substrate thickness (thereby mass) effects the specific power of the TCP.

FIG. 32 is a table showing exemplary MOSSA string performance metrics.

Given that each TCP has (6) 12-string sections, the estimated total power output for one TCP (in lab conditions) is 94.56 W/kg. A full 3-panel array with 3 TCPs is estimated to output 283.68 W. From the estimated power performance (283.68 W) and mass (2 kg) of the MOSSA, the specific power of this system is 141.84 W/kg, below the desired 200 W/kg. Given a two wing system of the half sized array, about ~600 W of power can be produced. Considering the full scale 1 m×1 m 3-panel system, a power output of >1000 W can be achieved with 2 wings. Further, if the full scale system is successfully able to incorporate 9 panels by deploying in both axial and lateral directions, power output of ~2000 W is not unreasonable.

The stowed 3-panel array has a thickness of just under ¼" (6.22 mm). Given that the panels are each 23"×23" the total stowed volume of the array is 132.25 in3 (0.0022 m3). Given the stowed volume and power output per array, the calculated power density of a 3-panel MOSSA is 128.95 kW/m3, which far exceeds the desired 30 kW/m3.

Array Structure and Deployment Kinematics—The underlying skeletal structure of the array was found to be much stiffer than anticipated and was able to hold its own weight under gravity when held out straight and parallel with the ground.

Figure 33:
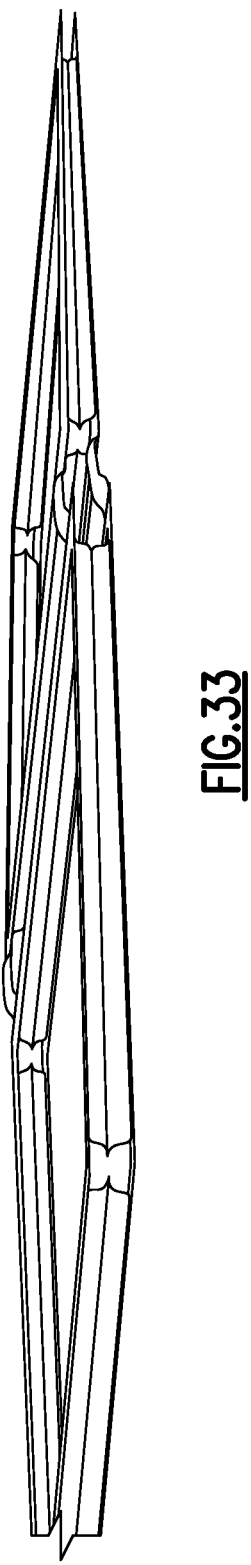
FIG. 33 is a drawing showing an exemplary 2-panel MOSSA held flat out under its own weight.
Figure 34:
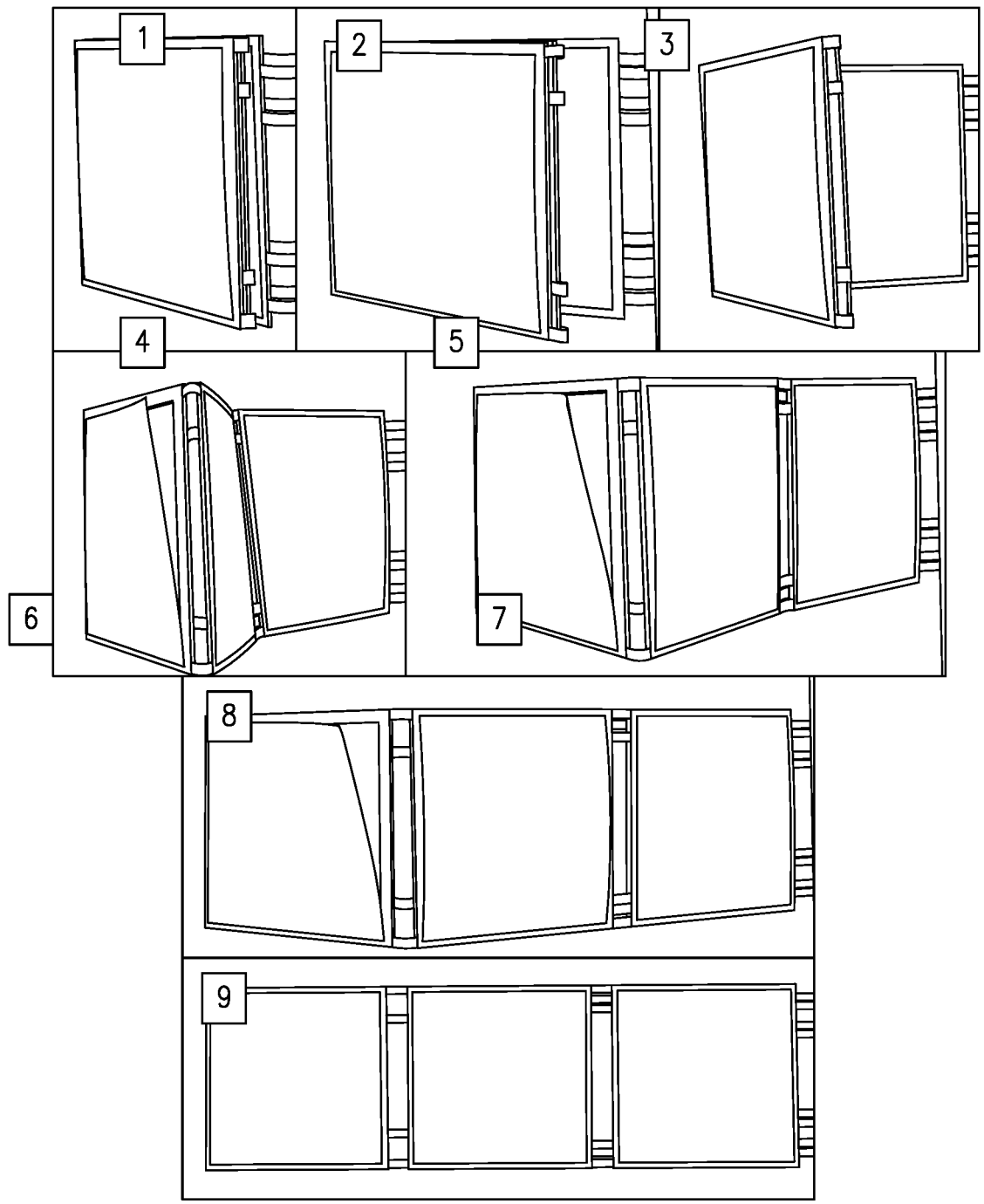
FIG. 34 is a drawing showing an exemplary MOSSA deployment sequence.

FIG. 33 is a drawing showing an exemplary 2-panel MOSSA held flat out under its own weight demonstrating the rigidity of a 2 panel array assembly according to the Application. Deployment testing demonstrated that the array architecture deploys in a predictable and reliable manner and demonstrated that the array maintained robustness under multiple cycles of dynamic loading. Multiple deployments were tested, and the kinematics of deployment were consistent each time. The deployment of the array in air with mock TCP panels in place was non-violent and consistent each time, while the deployment of the array with the TCP panels removed was much faster and more violent due to the decrease in drag. However, the removal of inertial mass from the array also caused an increase in deployment speed and if full mass TCPs were used, the deployment may have been less violent. Through all deployment tests, no panel faces contacted another or any other part of the array, indicating that the fragile solar cells of the MOSSA (as a 3-panel array) will not be damaged during array deployment. FIG. 34 is a drawing showing an exemplary MOSSA deployment sequence.

Figure 35A:
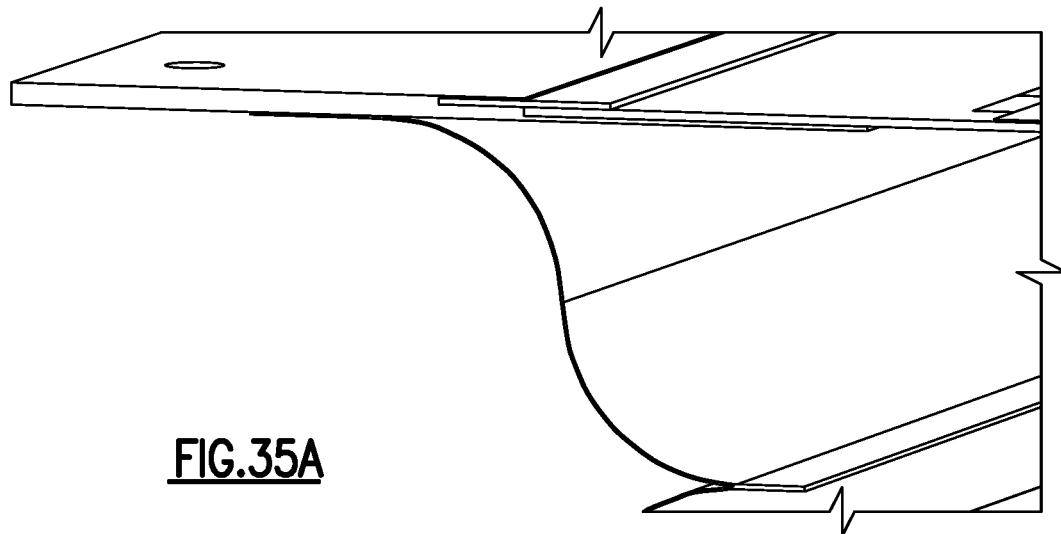
FIG. 35A is a drawing showing one exemplary retention strip.

TCP Retention Feature—In some exemplary MOSSA, the TCP is held in place by a retention strip. FIG. 35A is a drawing showing one exemplary retention strip. The strip can be pushed into a slot in the frame where the strip also holds or retains the TCP in the frame by extending part way out over the TCP. The retaining strip can be held in part by a slight interference fit in the slot. There can also be an adhesive of the like disposed between the surface of the retention strip and the adjacent TCP surface. Any suitable adhesive can be used. Suitable adhesives, include, for example, film adhesives available from the 3M company of St. Paul, MN The retention strip can be made of any suitable material, such as, for example, as cut from a sheet of a carbon composite material. Example—In one experimental implementation, ⅛" retention strips were cut from a flat sheet of cured carbon composite.

Figure 35B:
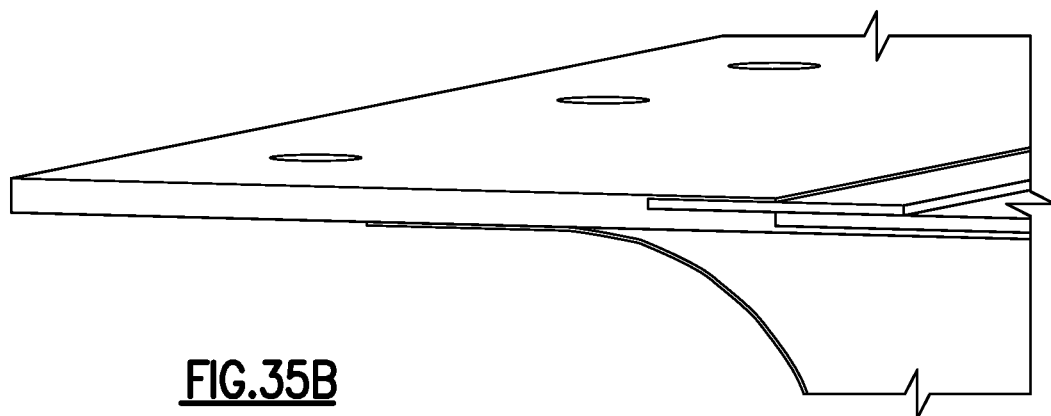
FIG. 35B is another drawing showing a retention strip.
Figure 35C:
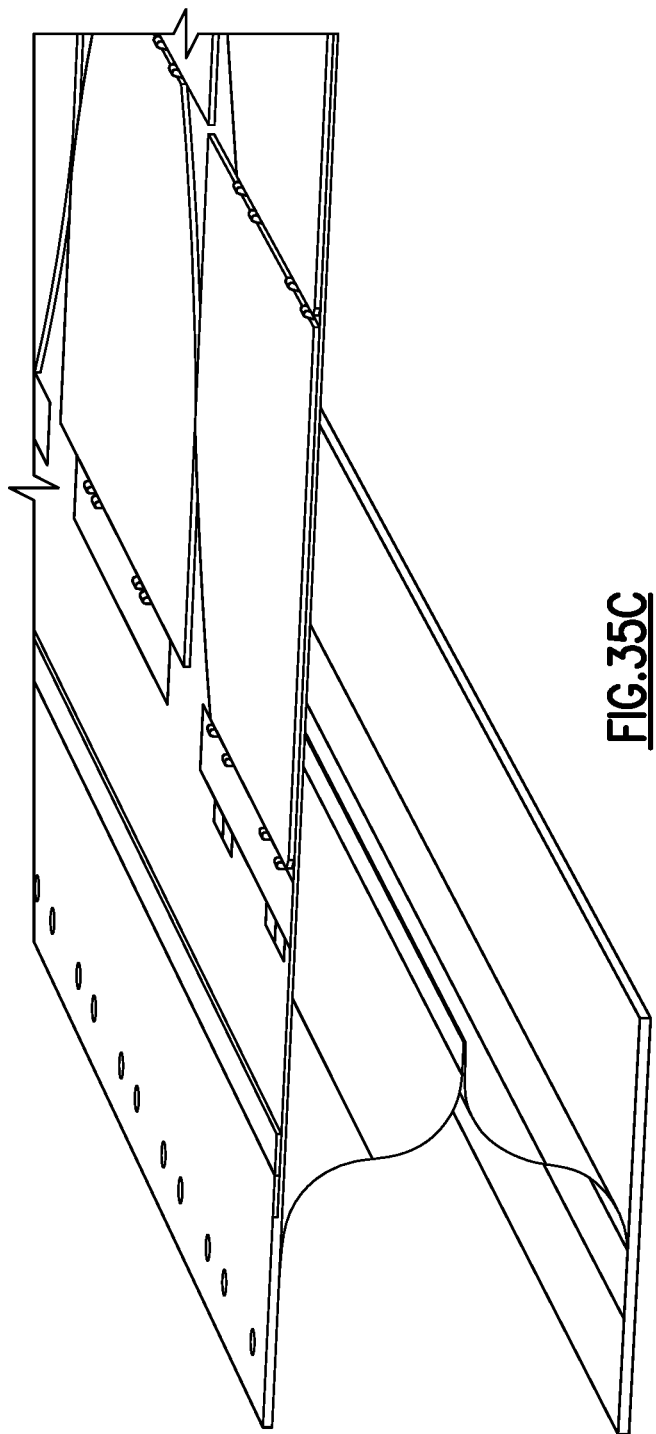
FIG. 35C is yet another drawing showing a retention strip in relation to the TCP and a DSS.

FIG. 35B is another drawing showing a retention strip. FIG. 35C is yet another drawing showing a retention strip in relation to the TCP and a DSS.

MOSSA Restraints—When stowed (panels and hinges folded), any suitable restraint techniques can be used to hold or restrain the MOSSA in the stowed state (where the hinges are loaded with potential energy prior to release deployment of MOSSA).

In the experimental implementations which follow, we used a TiNi Mini or Micro Latch. Note that any suitable latch/fastener that can be remotely severed, can be used in place of the exemplary TiNi Latch. Suitable latch/fasteners include pyrotechnic and non-pyrotechnic separation nuts and latch release devices.

Figure 36A:
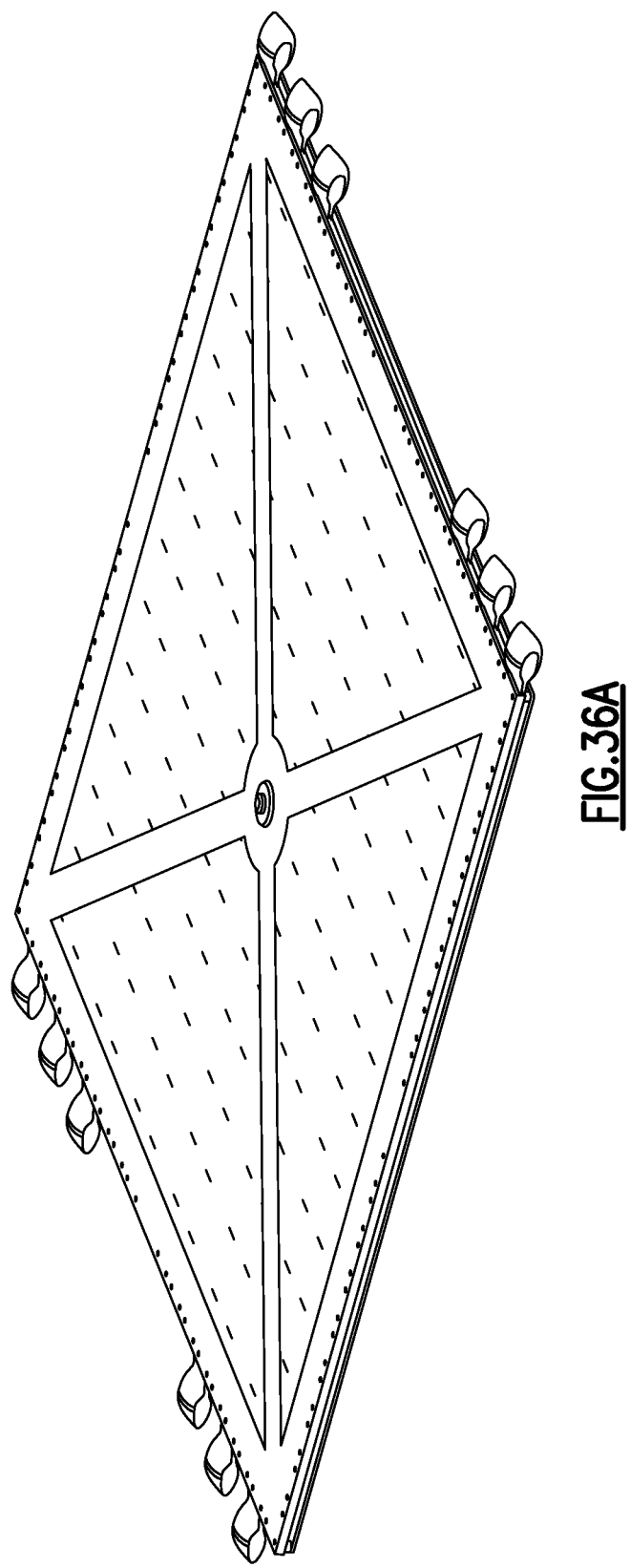
FIG. 36A is a drawing showing an exemplary center bolt retention scheme.
Figure 36B:
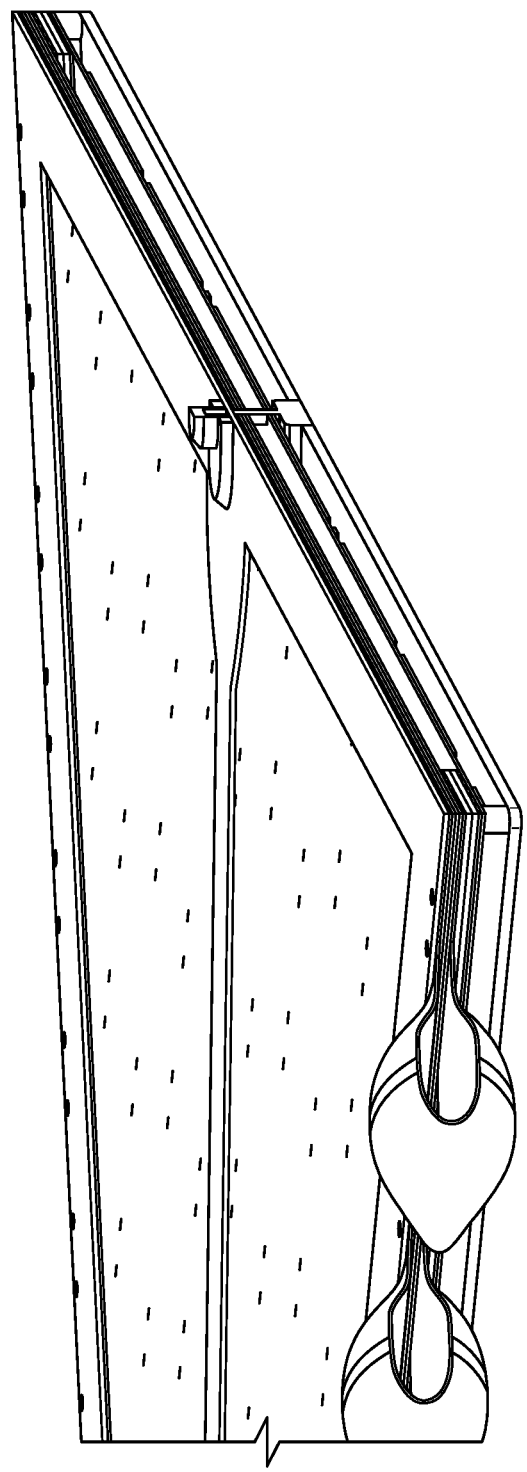
FIG. 36B is a drawing showing a cutaway view of an exemplary panel and bolt.

Example 1—Center Bolt Retention. FIG. 36A is a drawing showing an exemplary center bolt retention scheme. A single centrally mounted TiNi Micro Latch holds the MOSSA stack in the stowed state against a spacecraft. The outward facing bottom panel is reinforced to distribute the clamping force from the TiNi Micro Latch. Standoffs are needed to hold the relatively fragile CICs off of the retention plate. FIG. 36B is a drawing showing a cutaway view of an exemplary panel and bolt.

Figure 36C:
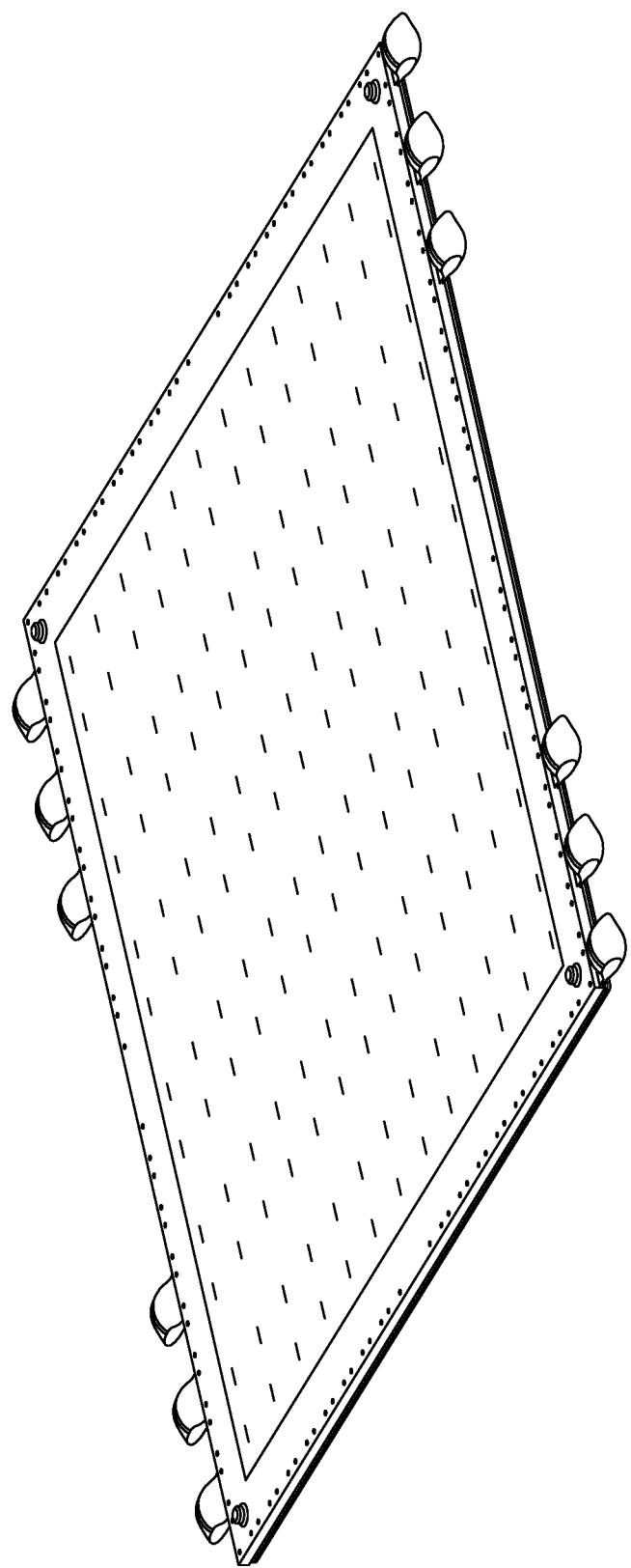
FIG. 36C is a drawing showing an exemplary corner bolt retention scheme.
Figure 36D:
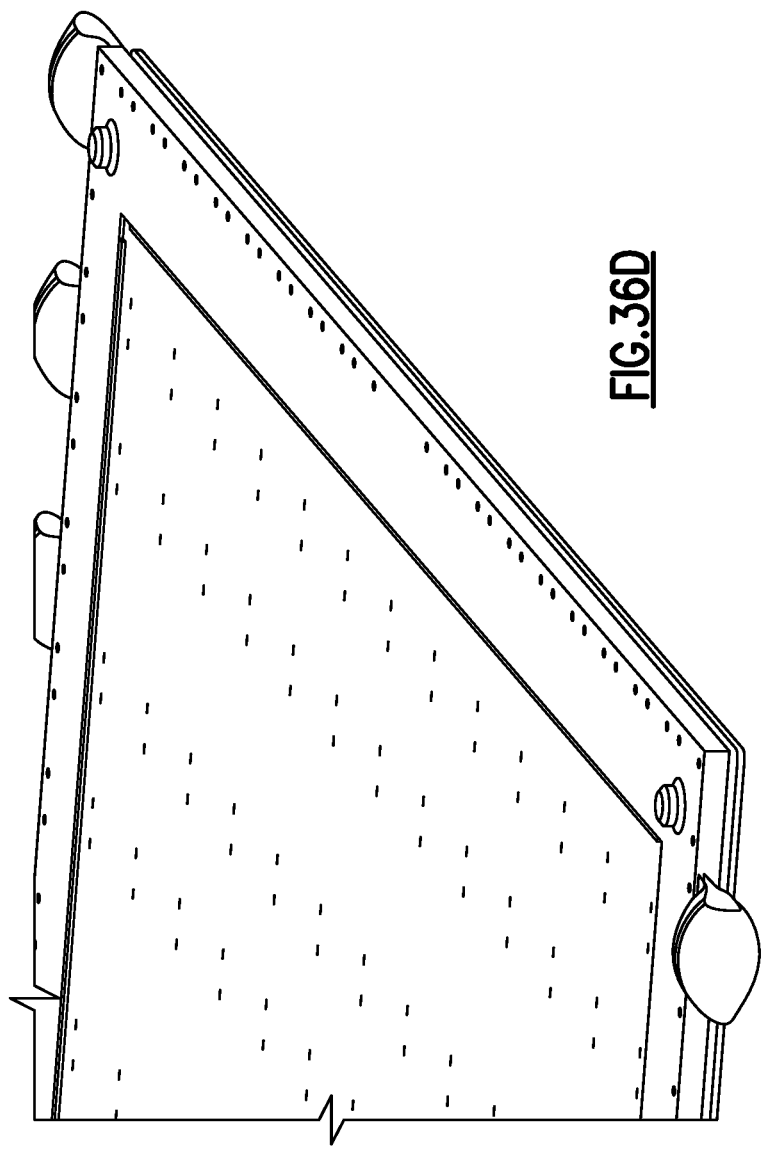
FIG. 36D is another drawing showing the exemplary corner bolt retention scheme.

Example 2—Corner Bolt Retention. FIG. 36C is a drawing showing an exemplary corner bolt retention scheme. This corner bolt retention scheme is similar to the center bolt retention scheme. The need for a reinforced rear bottom panel is eliminated. There is a need to synchronize the 4 independent TiNi Micro Latches. FIG. 36D is another drawing showing the exemplary corner bolt retention scheme.

Figure 36E:
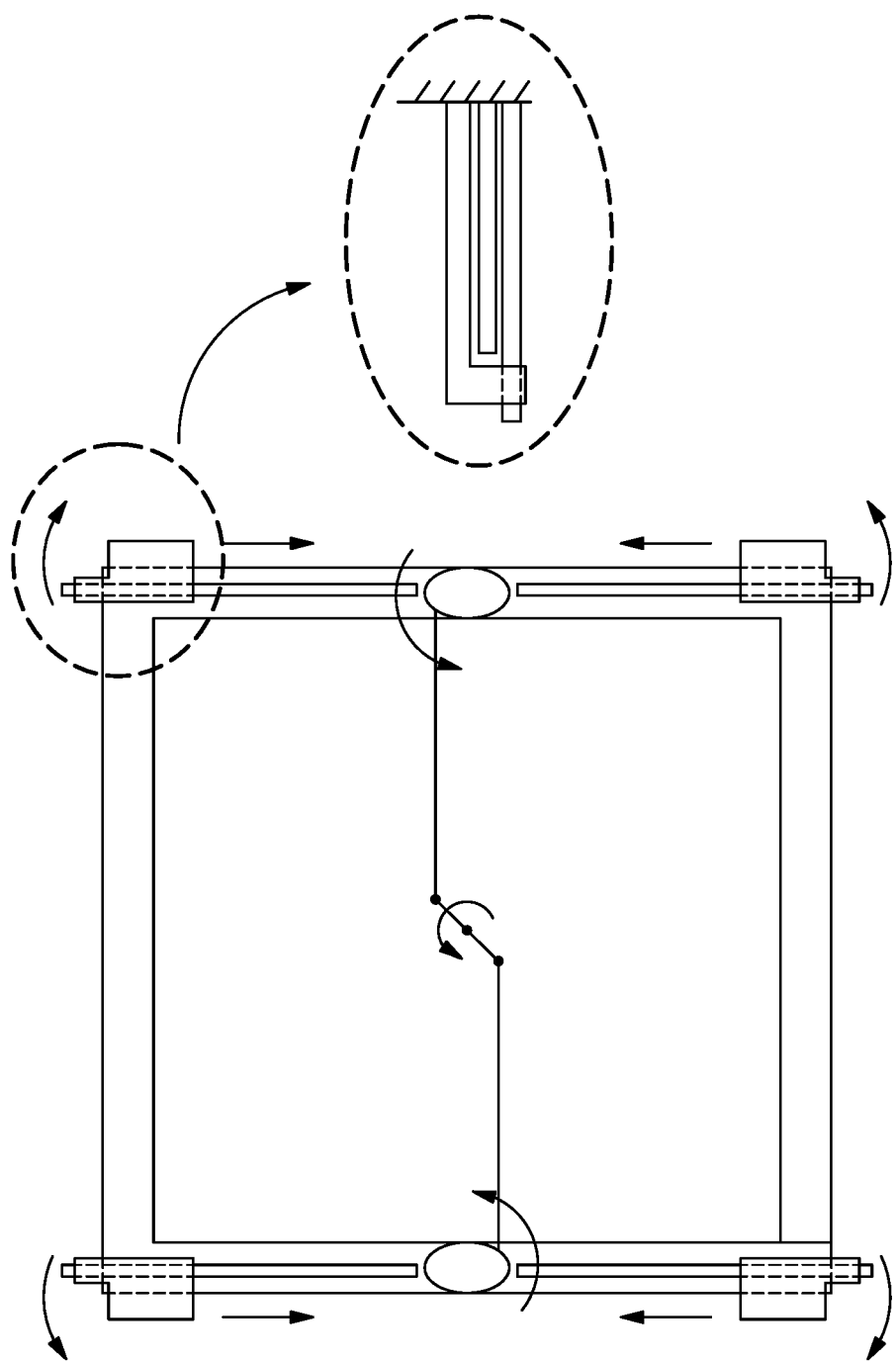
FIG. 36E is a drawing showing an exemplary cam lock retention scheme.

Example 3—Cam Lock Retention. FIG. 36E is a drawing showing an exemplary cam lock retention scheme. This cam lock retention scheme uses a central torque device that when activated either pulls a pin, releasing a wound torque spring, or a device that achieves the same mechanical operation. The rotating central rod pulls connecting rods that rotate adjacent cams. The cams, when rotated, allow the vertical rots to retract and unlatch sprung clamps. Then the clamps are released, they spring outwards (out of the page), and release the stowed MOSSA without interference.

As described hereinabove, at least one panel at an end of a column of panels can be hingedly coupled to a base section of a spacecraft or satellite, such as, for example, by yoke 103. Also, as previously described, the self-deployable array of panels include a plurality of panels, each panel having a first compressed panel thickness state and a second expanded panel thickness state, and including a spring bias element biased to the second expanded panel thickness state. In the case of a yoke of the type of yoke 103, on reaching the second expanded panel thickness state, the yoke springs in addition to locking in an open position, take on slight longitudinal angles to the now expanded panels.

Figure 37:
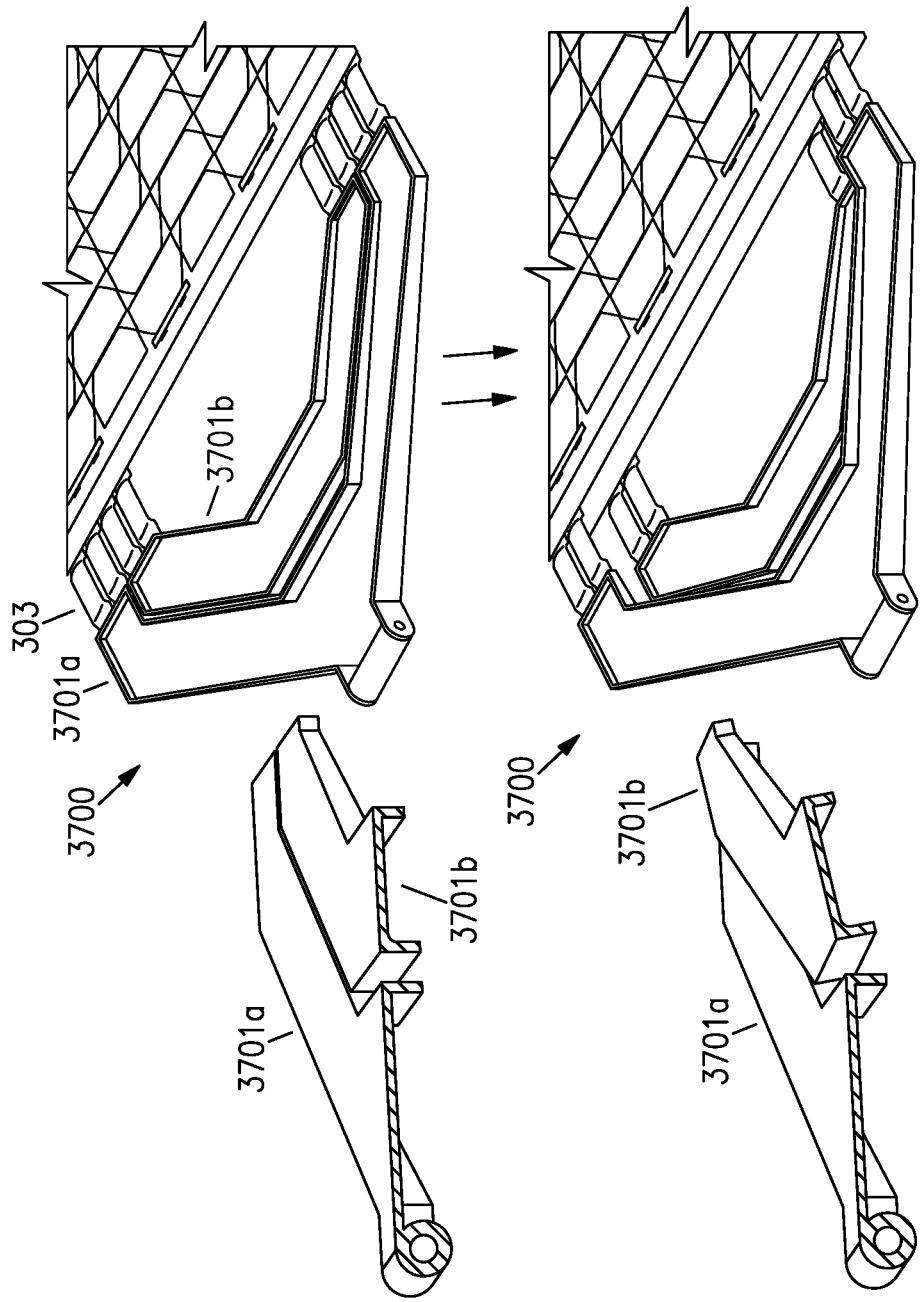
FIG. 37 is a drawing showing an exemplary morphing cross-section yoke.

Morphing Cross-Section Yoke—An alternative yoke, a morphing cross-section yoke allows a MOSSA to expand in its cross-section during deployment while maintaining a rigid contact with both planes of MOSSA in its deployed and expanded state. FIG. 37 is a drawing showing an exemplary morphing cross-section yoke 3700. Yoke 3701b rotates within yoke 3701a about a hinge 3703. Any suitable hinge can be used ranging from a flexible material sheet, such as, for example as shown by hinge 3703, to a pivot or pin based hinge. Here, Yoke 3701b and yoke 3701a lie in about a common plane (top of FIG. 37) prior to panel expansion. After panel expansion, the yokes pivot apart (bottom of FIG. 37) by a slight rotation about hinge 3703.

Figure 38:
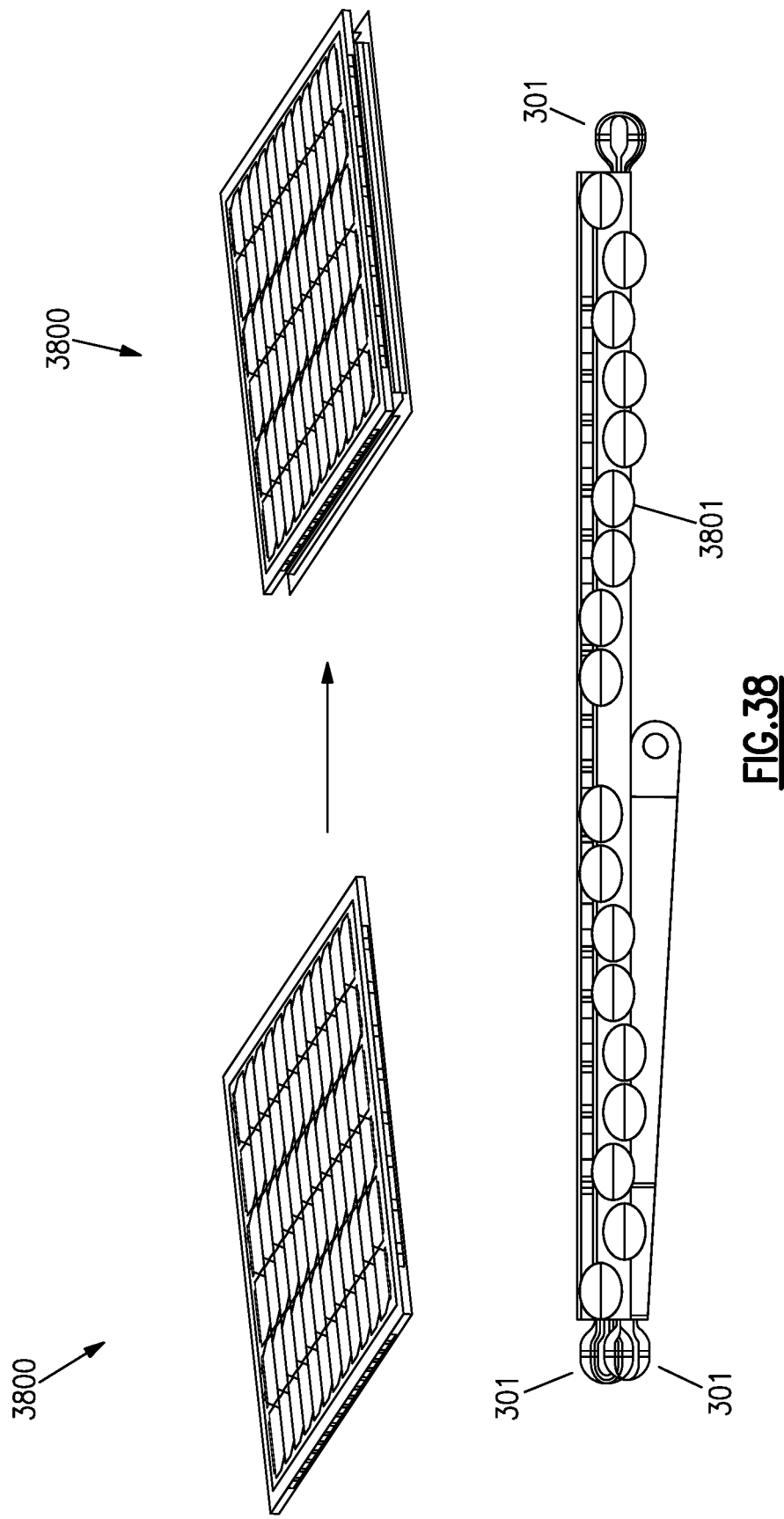
FIG. 38 is a drawing showing an exemplary compression panel with a stiffening material.

Compression Panel—A thickened and rigid panel can be placed within the panel array. A compression panel can also be an outboard most panel in a stowed state. In the stowed state, the compression panel can help to prevent damage due to launch vibrations and panel contact from intense vibrations experienced during launch. FIG. 38 is a drawing showing an exemplary compression panel 3800 with a stiffening material 3801. Any suitable stiffening material can be used. An outboard compression panel can also provide hardpoints for some HDRM (such as, for example, TiNi actuators described hereinabove) to rigidly mount to MOSSA and provide a requisite array clamp force for stack consolidation in the stowed state.

Figure 39:
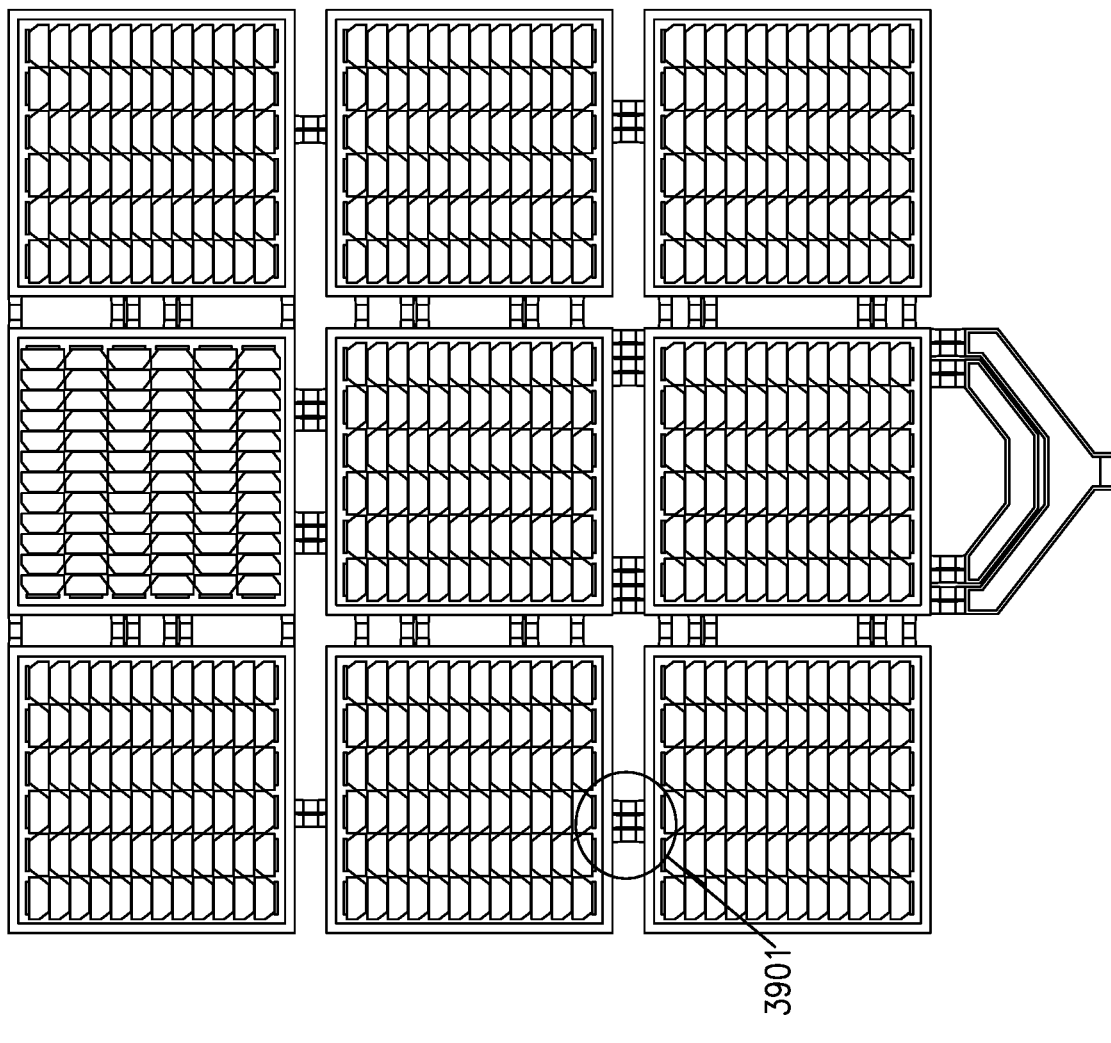
FIG. 39 is a drawing showing an exemplary deployed MOSSA with flanking hinges.

Flanking Hinges—Flanking hinges include hinges oriented parallel with the primary axis (long axis) of MOSSA and located between any two or three adjacent panels that are flanking the 3 root panels. Flanking hinges improve and control the opening sequence during a MOSSA deployment. The flanking hinges prevent the deployment of the "flanking" panels until, after the root panels (the center panels) have deployed flat. Flanking hinges can substantially eliminate panel interference during deployment, which might otherwise result in damage to the cells or structure of MOSSA. FIG. 39 is a drawing showing an exemplary deployed MOSSA 3900 with flanking hinges 3901. Compared to, for example, FIG. 1 which has no hinges between those corresponding MOSSA panels. Flanking hinges can allow a MOSSA to have some passive ability to sequence its deployment (i.e., root panels unfold first, then flanking panels unfold). Flanking hinges can also allow a MOSSA to prevent panel interference during deployment, where the panels are physically held away from each other via the hinges.

Figure 40A:
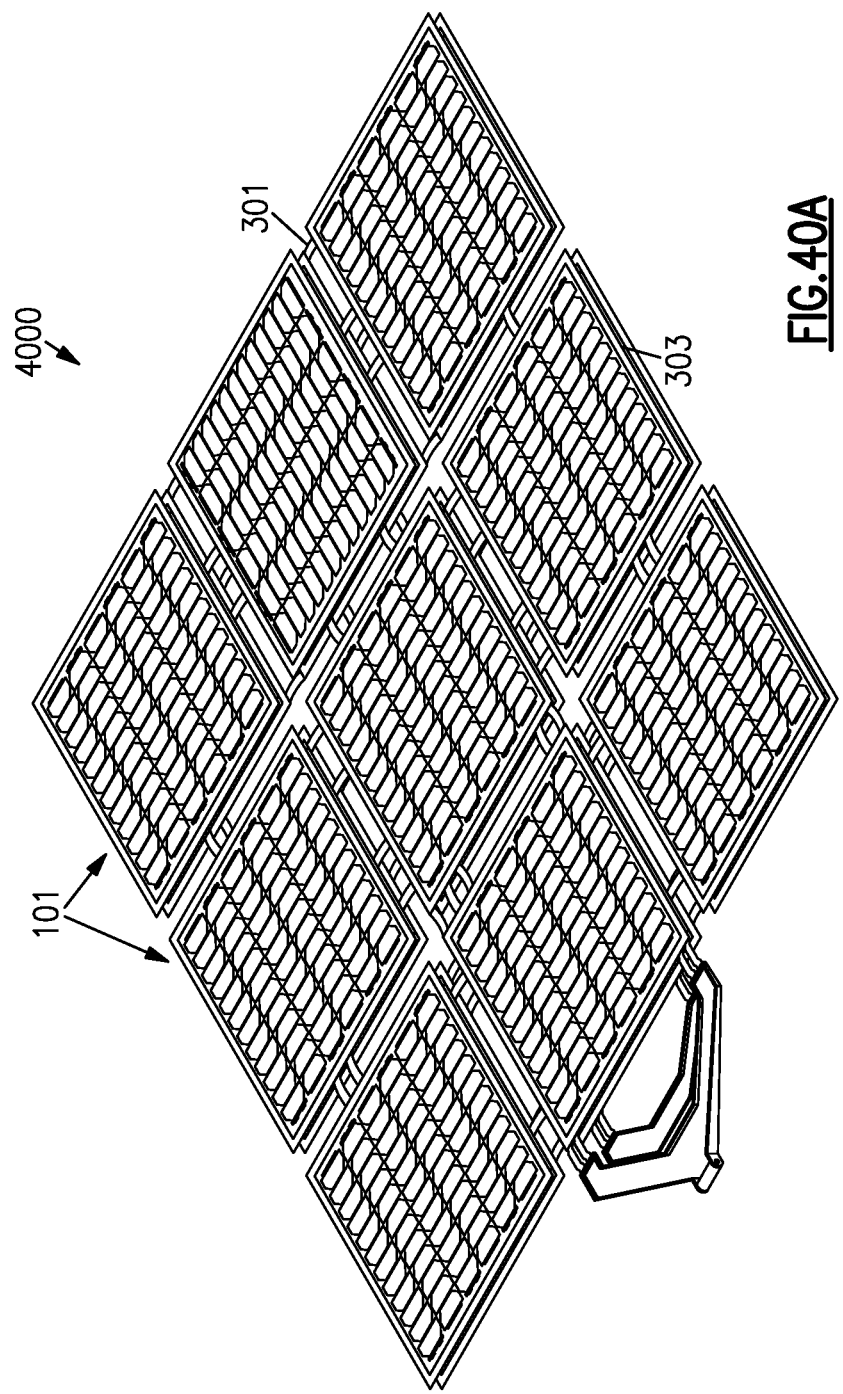
FIG. 40A is a drawings showing another exemplary MOSSA according to the application in a deployed state.
Figure 40B:
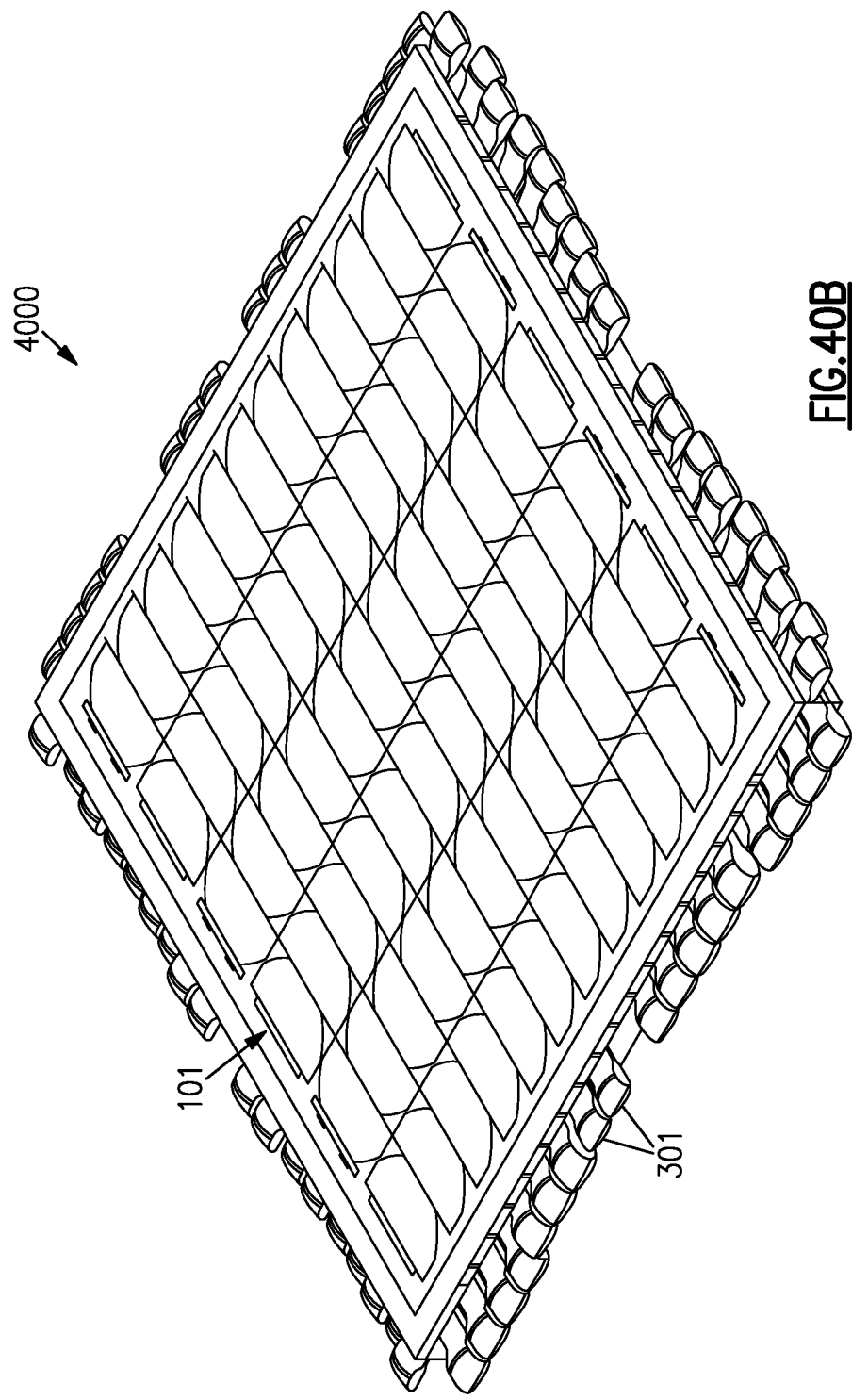
FIG. 40B is a drawing showing the MOSSA of FIG. 40A in a stowed or folded state.
Figure 40C:
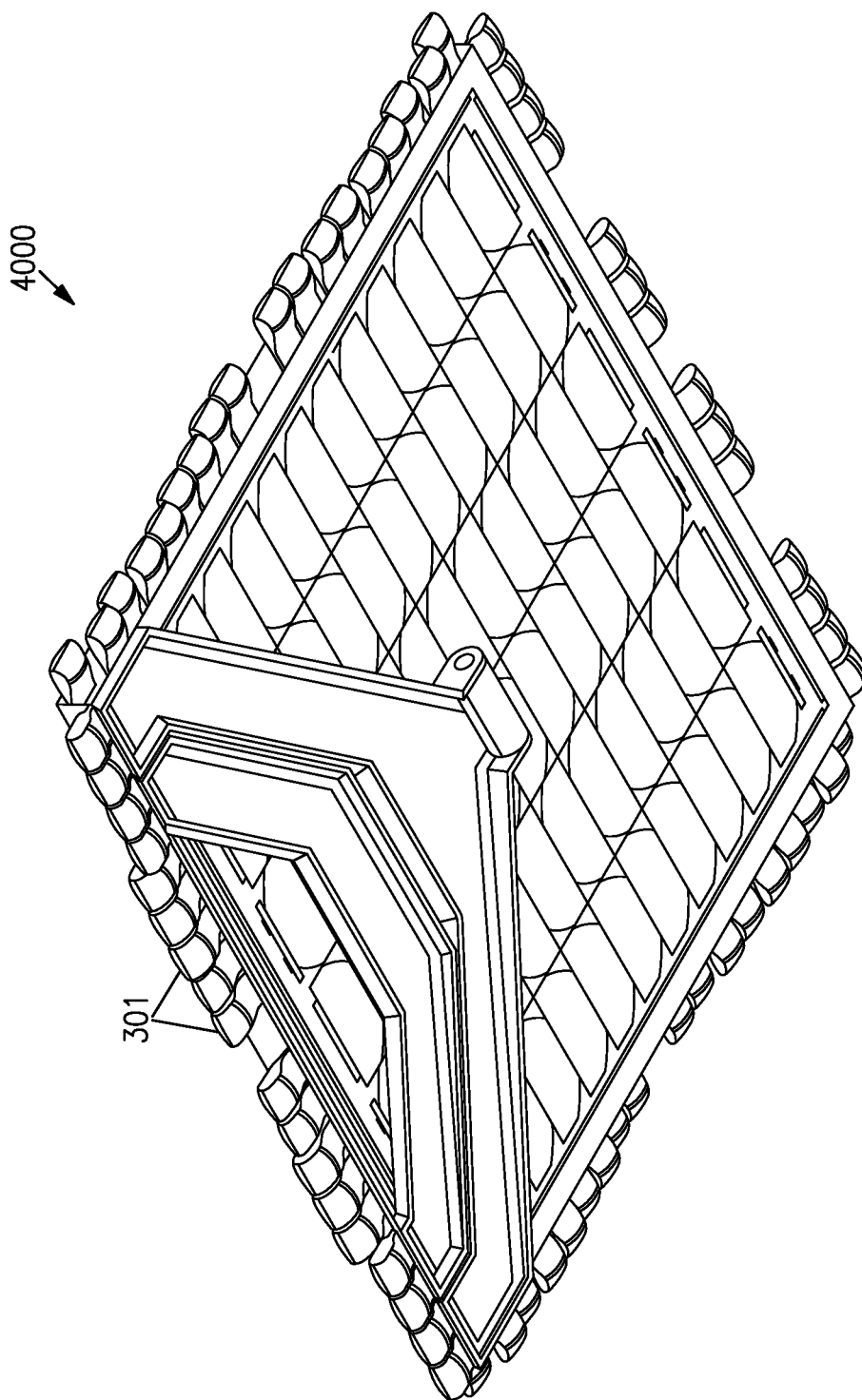
FIG. 40C is a drawing showing a bottom view of the MOSSA of FIG. 40B.

Exemplary MOSSA having morphing cross-section yoke, an exemplary compression panel, and flanking hinges—FIG. 40A is a drawings showing another exemplary MOSSA according to the application in a deployed state. FIG. 40B is a drawing showing the MOSSA of FIG. 40A in a stowed or folded state. FIG. 40C is a drawing showing a bottom view of the MOSSA of FIG. 40B. FIG. 40D is a drawing showing a side view of the MOSSA of FIG. 40B.

CONCLUSION

Generally, a self-deployable array of panels (e.g. FIG. 1 100, FIG. 40a, 400) includes a plurality of panels (e.g. FIG. 1 101, FIG. 40A, 101), each panel having a first compressed panel thickness state (e.g. FIG. 4B, FIG. 4C 400, FIG. 28, FIG. 36C, FIG. 40B 4000) and a second expanded panel thickness state (e.g. FIG. 1, FIG. 3A, FIG. 4A, 4000, FIG. 17, 1700, FIG. 25, 1700, FIG. 26, FIG. 40A), and including a spring bias element (e.g. FIG. 3C, 303) biased to the second expanded panel thickness state. A plurality of locking hinges (e.g., FIG. 3B, 301) hingedly couple each of the panels to an adjoining panel. Each locking hinge (e.g., FIG. 3B, 301) is biased to an open position. A release of stored potential energy of both of the spring bias element biased to the second expanded panel thickness state, and the locking hinges biased to the open position causes the self-deployable array of panels to self-deploy (e.g., FIG. 1, FIG. 40A) from a folded stowed state (e.g., FIG. 40B).

A single part offset locking hinge (FIG. 3B, 301, FIG. 18, 301) includes a center locking spring section (FIG. 18, 1801). A transition section (FIG. 18, 1803) extends from each end of the center locking spring section. An offset mounting flange (FIG. 18, 1805) extends from each outer end of each transition section.

An experimental implementation was made of an MOSSA for use as a "flexible" solar array. The described solution works as intended and has excellent potential for rapid improvement. The results of experimental testing of the MOSSA and the subsequent kinematic deployment testing demonstrated that the array is stiff enough to perform its desired function while also maintaining the ability to stow to extremely low stow volumes. The nature of the components used to construct the array allow for excellent potential for scalability and modularity, if necessary, while also being easy and cheap to manufacture. MOSSA are both relatively easy and relatively inexpensive to manufacture in bulk quantities.

The power density of the experimentally implemented array is an exceptional at 129 kW/m3. Note that the performance metrics outlined in this Application do not include the masses associated with harnessing, launch restraints, and gimbals.

Improvements to the TCP substrate will be made to reach a desired specific power of 200 W/kg. Cross-members can be optionally added across the panel frames to support the TCP, which will add some mass to the panel frames, however, the tradeoff in added mass to the panel frames versus the reduction in mass to the TCP substrate will still net a reduction in overall system mass and increase specific power. A reduction of the panel frame perimeter width, or direct application of the TCP to the top panel will increase the TCP substrate area and permit the use of more solar cells for the same sized array panel area, also increasing specific power.

The results of the kinematic deployment testing indicated that the stiffening ribs effectively stiffened the panel assembly. The stiffening ribs were also able to hold a TCP rigidly in place. The hinges connecting the panels to one another were an area of concern because of the reduced moment of inertia at these junctions, however the use of hinges on both the top and bottom panels allowed for an effective load path and increase in effective stiffness between panels.

Software for designing, modeling, testing (e.g., computer controlled measurement equipment), controlling, and/or operating a stiffened thin panel MOSSA (e.g., deployment and/or release mechanisms) and hinge according to the Application can be provided on a computer readable non-transitory storage medium. A computer readable non-transitory storage medium as non-transitory data storage includes any data stored on any suitable media in a non-fleeting manner Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A self-deployable array of modules comprising:
a plurality of locking hinges coupling adjoining modules in spaced relation, wherein said modules are joined via a hinge apparatus for coupling at least two modules, which comprises:
a hinge member defining a longitudinal axis, including:
a center segment;
a transition segment extending from opposed ends of the center segment; and
a mounting flange segment extending from opposed ends of the transition segment, each mounting flange segment being offset with respect to the center segment, and
wherein the hinge member is configured to lock upon transitioning to the open condition.

2. The self-deployable array of modules according to claim 1 wherein the hinge member is configured to transition between a closed condition and an open condition.

3. The self-deployable array of modules according to claim 2 wherein the center segment is flexible to permit movement of the hinge member between the closed condition and the open condition.

4. The self-deployable array of modules according to claim 3 wherein the hinge member is biased toward the open condition.

5. The self-deployable array of modules according to claim 4 wherein the center segment has a flexibility greater than a corresponding flexibility of each transition segment.

6. The self-deployable array of modules according to claim 5 wherein the center segment is configured to bend during movement of the hinge member between the closed condition and the open condition.

7. The self-deployable array of modules according to claim 6 wherein the center segment has a greater flexibility than a corresponding flexibility of each flange segment.

8. The self-deployable array of modules according to claim 2 wherein the hinge member is further configured to transition to a flat condition.

9. The self-deployable array of modules according to claim 1 wherein the center segment comprises one of a curved cross-section and a prismatic cross-section.

10. The self-deployable array of modules according to claim 1 wherein each transition segment comprises a tangential spline shape.

11. The self-deployable array of modules according to claim 10 wherein each transition segment includes an outer surface defining multiple radii of curvature.

12. The self-deployable array of modules according to claim 1 wherein each transition segment is obliquely arranged with respect to the longitudinal axis.

13. The self-deployable array of modules according to claim 1 wherein the hinge member is a single monolithic unit.

14. The self-deployable array of modules according to claim 1 wherein the hinge member comprises a composite material.

15. The self-deployable array of modules according to claim 1 wherein each flange segment defines an opening to permit passage of a fastener.

16. A self-deployable array of modules comprising:
a plurality of locking hinges coupling adjoining modules in spaced relation, wherein said locking modules are joined via a hinge apparatus for coupling at least two modules, which comprises:
a hinge member defining a longitudinal axis, including:
a center segment;
a transition segment extending from opposed ends of the center segment; and
a mounting flange segment extending from opposed ends of the transition segment;
wherein the center segment defines a flexibility greater than a corresponding flexibility of each transition segment;
wherein the center segment is configured to bend to permit transition of the hinge member between the closed condition and the open condition, and
wherein the hinge member is configured to lock upon transitioning to the open condition.

17. The self-deployable array of modules according to claim 16 wherein the center segment is normally biased toward an orientation corresponding to the open condition of the hinge member.

18. The self-deployable array of modules according to claim 16 wherein the hinge member is a single monolithic unit.

* * * * *